US012273210B2

(12) United States Patent
Qiao et al.

(10) Patent No.: US 12,273,210 B2
(45) Date of Patent: *Apr. 8, 2025

(54) DEVICE TYPE INDICATION IN SESSION MANAGEMENT OPERATION

(71) Applicant: Peninsula Technologies, LLC, Allen, TX (US)

(72) Inventors: Weihua Qiao, Herndon, VA (US); Esmael Hejazi Dinan, McLean, VA (US); Kyungmin Park, Vienna, VA (US); Peyman Talebi Fard, Vienna, VA (US)

(73) Assignee: Peninsula Technologies, LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,124

(22) Filed: Feb. 17, 2023

(65) Prior Publication Data

US 2023/0198787 A1    Jun. 22, 2023

Related U.S. Application Data

(63) Continuation of application No. 17/062,794, filed on Oct. 5, 2020, now Pat. No. 11,588,656, which is a
(Continued)

(51) Int. Cl.
*H04L 12/14* (2024.01)
*B60L 53/30* (2019.01)
(Continued)

(52) U.S. Cl.
CPC ........ *H04L 12/1407* (2013.01); *B60L 53/305* (2019.02); *H04M 15/61* (2013.01);
(Continued)

(58) Field of Classification Search
CPC .... H04L 12/1407; H04W 72/04; H04W 8/02; H04W 76/10; H04W 4/24
See application file for complete search history.

(56) References Cited

U.S. PATENT DOCUMENTS 9,635,636 B1 *   4/2017  Cai ...................... H04W 80/10
2015/0189097 A1 *  7/2015  Sharma ............. H04M 15/8228
                                                        370/259
(Continued)

FOREIGN PATENT DOCUMENTS

CN          109218032 A      1/2019

OTHER PUBLICATIONS

3GPP TS 23.501 V1.4.0(Sep. 2017).*
(Continued)

*Primary Examiner* — Parth Patel
(74) *Attorney, Agent, or Firm* — Ascenda Law Group, PC

(57) ABSTRACT

A session management function (SMF) may include one or more processors and memory storing instructions that, when executed by the one or more processors, cause the SMF to perform operations. The operations may include selecting a user plane function based on a device type of a wireless device, responsive to a session establishment request to establish a packet data unit (PDU) session for the wireless device. An indication of the device type may be provided with the session establishment request. The operations may also include sending, to the user plane function, reporting rules based on a charging policy received from a policy control function (PCF) responsive to a charging policy request to the PCF.

20 Claims, 24 Drawing Sheets

Related U.S. Application Data continuation of application No. 16/217,166, filed on Dec. 12, 2018, now Pat. No. 10,797,894.

(60) Provisional application No. 62/613,317, filed on Jan. 3, 2018, provisional application No. 62/611,308, filed on Dec. 28, 2017.

(51) Int. Cl.
*H04M 15/00* (2024.01)
*H04W 4/24* (2024.01)
*H04W 8/02* (2009.01)
*H04W 72/04* (2023.01)
*H04W 76/10* (2018.01)

(52) U.S. Cl.
CPC .......... *H04M 15/66* (2013.01); *H04M 15/82* (2013.01); *H04W 4/24* (2013.01); *H04W 8/02* (2013.01); *H04W 72/04* (2013.01); *H04W 76/10* (2018.02)

(56) References Cited

U.S. PATENT DOCUMENTS

| | | | | |
|---|---|---|---|---|
| 2016/0337832 | A1* | 11/2016 | Chiaverini | H04W 4/24 |
| 2017/0104609 | A1* | 4/2017 | Mcnamee | H04W 4/24 |
| 2017/0339282 | A1* | 11/2017 | Li | H04M 15/41 |
| 2017/0359749 | A1* | 12/2017 | Dao | H04L 47/2416 |
| 2018/0069798 | A1* | 3/2018 | Bacik | H04L 43/026 |
| 2018/0115885 | A1* | 4/2018 | Berzin | H04M 15/66 |
| 2018/0176768 | A1* | 6/2018 | Baek | H04W 8/205 |
| 2018/0183938 | A1* | 6/2018 | Cai | H04L 12/14 |
| 2018/0192471 | A1* | 7/2018 | Li | H04W 4/50 |
| 2018/0199243 | A1* | 7/2018 | Bharatia | H04W 36/0066 |
| 2018/0199398 | A1* | 7/2018 | Dao | H04L 41/0806 |
| 2018/0227743 | A1* | 8/2018 | Faccin | H04W 8/08 |
| 2018/0270888 | A1* | 9/2018 | Faccin | H04W 76/15 |
| 2018/0317157 | A1* | 11/2018 | Baek | H04W 28/16 |
| 2018/0352483 | A1* | 12/2018 | Youn | H04W 76/11 |
| 2018/0359795 | A1* | 12/2018 | Baek | H04W 76/15 |
| 2018/0367675 | A1* | 12/2018 | Ni | H04L 12/14 |
| 2019/0007992 | A1* | 1/2019 | Kim | H04W 76/27 |
| 2019/0053104 | A1* | 2/2019 | Qiao | H04M 15/66 |
| 2019/0053147 | A1* | 2/2019 | Qiao | H04W 28/24 |
| 2019/0059067 | A1* | 2/2019 | Lee | H04W 28/10 |
| 2019/0069199 | A1* | 2/2019 | Yan | H04W 28/12 |
| 2019/0090164 | A1* | 3/2019 | Ding | H04W 36/385 |
| 2019/0098547 | A1* | 3/2019 | Chong | H04W 36/00 |
| 2019/0109721 | A1* | 4/2019 | Qiao | H04L 47/24 |
| 2019/0109823 | A1* | 4/2019 | Qiao | H04L 47/24 |
| 2019/0116486 | A1* | 4/2019 | Kim | H04W 8/10 |
| 2019/0116631 | A1* | 4/2019 | Talebi Fard | H04W 80/10 |
| 2019/0124508 | A1* | 4/2019 | Watfa | H04L 63/0876 |
| 2019/0124589 | A1* | 4/2019 | Bogineni | H04W 36/32 |
| 2019/0150219 | A1* | 5/2019 | Wang | H04W 76/30 370/329 |
| 2019/0158985 | A1* | 5/2019 | Dao | H04W 28/04 |
| 2019/0166467 | A1* | 5/2019 | Livanos | H04W 8/186 |
| 2019/0166633 | A1* | 5/2019 | Koshimizu | H04L 65/1069 |
| 2019/0207778 | A1* | 7/2019 | Qiao | H04W 76/10 |
| 2019/0261260 | A1* | 8/2019 | Dao | H04W 8/08 |
| 2019/0313473 | A1* | 10/2019 | Kim | H04W 48/02 |
| 2019/0356603 | A1* | 11/2019 | Hamzeh | H04L 47/15 |
| 2019/0387373 | A1* | 12/2019 | Chai | H04M 15/66 |
| 2019/0387428 | A1* | 12/2019 | Ahmad | H04L 69/08 |
| 2019/0394279 | A1* | 12/2019 | Dao | H04W 48/04 |
| 2020/0079883 | A1* | 3/2020 | Walther | C08L 23/0815 |
| 2020/0128614 | A1* | 4/2020 | Ying | H04W 48/18 |
| 2020/0145884 | A1* | 5/2020 | Guo | H04M 15/8016 |
| 2020/0163012 | A1* | 5/2020 | Zhu | H04W 12/08 |
| 2020/0169639 | A1* | 5/2020 | Chai | H04M 15/64 |
| 2020/0305211 | A1* | 9/2020 | Foti | H04W 12/08 |

OTHER PUBLICATIONS

3Gpp TS 23.203 V14.4.0 (Jun. 2017); Technical Specification; 3rd Generation Partnership Project; Technical Specification Group Services and System Aspects; Policy and charging control architecture; (Release 14).

3GPP TS 23.401 V15.0.0 (Jun. 2017); Technical Specification; 3rd Generation Partnership Project; Technical Specification Group Services and System Aspects; General Packet Radio Service (GPRS) enhancements for Evolved Universal Terrestrial Radio Access Network (E-UTRAN) access; (Release 15).

3GPP TS 23.402 V15.0.0 (Jun. 2017); Technical Specification; 3rd Generation Partnership Project; Technical Specification Group Services and System Aspects; Architecture enhancements for non-3GPP accesses; (Release 15).

3GPP TS 23.501 V1.0.0 (Jun. 2017); Technical Specification; 3rd Generation Partnership Project; Technical Specification Group Services and System Aspects; System Architecture for the 5G System; Stage 2; (Release 15).

3GPP TS 23.502 V0.5.0 (Jul. 2017); Technical Specification; 3rd Generation Partnership Project; Technical Specification Group Services and System Aspects; Procedures for the 5G System; Stage 2; (Release 15).

3GPP TS 24.008 V14.4.0 (Jun. 2017); Technical Specification; 3rd Generation Partnership Project; Technical Specification Group Core Network and Terminals; Mobile radio interface Layer 3 specification; Core network protocols; Stage 3; (Release 14).

3GPP TS 24.301 V14.4.0 (Jun. 2017); Technical Specification; 3rd Generation Partnership Project; Technical Specification Group Core Network and Terminals; Non-Access-Stratum (NAS) protocol for Evolved Packet System (EPS); Stage 3; (Release 14).

S2-178309; SA WG2 Meeting #S2-124; Nov. 27-Dec. 1, 2017, Reno, Nevada, USA; Gsma IoTTF #14 LS to 3GPP SA2 and SA5 on Differentiation of LTE-M (eMTC) traffic from other LTE data traffic.

S2-178934; SA WG2 Meeting #S2-124; Nov. 27-Dec. 1, 2017, Reno, Nevada, USA; Title: [Draft]reply LS on Differentiation of LTE-M (eMTC) traffic from other LTE data traffic; Response to: LS to 3GPP SA2 and SA5 on Differentiation of LTE-M (eMTC) traffic from other LTE data traffic (S2-178309); Release: Rel-15.

* cited by examiner

| IEI | Information Element | Type/Reference | Presence | Format | Length |
|---|---|---|---|---|---|
| | Protocol discriminator | Protocol discriminator | M | V | 1/2 |
| | EPS bearer identity | EPS bearer identity | M | V | 1/2 |
| | Procedure transaction identity | Procedure transaction identity | M | V | 1 |
| | PDN connectivity request message identity | Message type | M | V | 1 |
| | Request type | Request type | M | V | 1/2 |
| | PDN type | PDN type | M | V | 1/2 |
| | ESM information transfer flag | ESM information transfer flag | O | TV | 1 |
| | Access point name | Access point name | O | TLV | 3-102 |
| | Protocol configuration options | Protocol configuration options | O | TLV | 3-253 |
| | Device properties | Device properties | O | TV | 1 |
| | NBIFOM container | NBIFOM container | O | TLV | 3-257 |
| | Header compression configuration | Header compression configuration | O | TLV | 5-257 |
| | Extended protocol configuration options | Extended protocol configuration options | O | TLV-E | 4-65538 |
| | Service type/Application type | Service type/Application type | O | V | 1 |

FIG. 18

Service type/application type value (octet 1)

Bits
8 7 6 5 4 3 2 1
0 0 0 0 0 0 0 0     mobile originating CS fallback or 1xCS fallback
0 0 0 0 0 0 0 1     mobile terminating CS fallback or 1xCS fallback
0 0 0 0 0 0 1 0     mobile originating CS fallback emergency call or 1xCS fallback emergency call
0 0 0 0 0 0 1 1     machine type communications;
0 0 0 0 0 1 0 0     ultra-reliable low-latency communications;
0 0 0 0 0 1 0 1     Vehicle-to-X communications;
0 0 0 0 0 1 1 0     IoT;
0 0 0 0 0 1 1 1     8K UHD(Video);
0 0 0 0 1 0 0 0     Other packet services;
0 0 0 0 1 0 0 1
: : :
All other values are reserved.

FIG. 19

Device type value (octet 1)

| Bits | | | | | | | | | |
|---|---|---|---|---|---|---|---|---|---|
| 8 | 7 | 6 | 5 | 4 | 3 | 2 | 1 | | |
| 0 | 0 | 0 | 0 | 0 | 0 | 0 | 0 | | |
| 0 | 0 | 0 | 0 | 0 | 0 | 0 | 1 | | IoT device |
| 0 | 0 | 0 | 0 | 0 | 0 | 1 | 0 | | Vehicle device |
| 0 | 0 | 0 | 0 | 0 | 0 | 1 | 1 | | cell phone |
| 0 | 0 | 0 | 0 | 0 | 1 | 0 | 0 | | wearable device |
| 0 | 0 | 0 | 0 | 0 | 1 | 0 | 1 | | sensor for industry automation |
| 0 | 0 | 0 | 0 | 0 | 1 | 1 | 0 | | other device |
| 0 | 0 | 0 | 0 | 0 | 1 | 1 | 1 | | |
| 0 | 0 | 0 | 0 | 1 | 0 | 0 | 0 | | |
| 0 | 0 | 0 | 0 | 1 | 0 | 0 | 1 | | |

...

All other values are reserved.

FIG. 20

Receive, by a policy control function from a PDN gateway, a 1st message requesting policy and charging control rule(s) for PDN session(s), the 1st message comprising a device type
2310

Determine, by the policy control function, the charging control rule(s) for the at least one PDN session based on the device type
2320

Send, by the policy control function to the PDN gateway and in response to the 1st message, a 2nd message comprising: the charging rule(s) and the device type
2330

FIG. 23

DEVICE TYPE INDICATION IN SESSION MANAGEMENT OPERATION

CROSS-REFERENCE TO RELATED APPLICATIONS

This application is continuation of U.S. application Ser. No. 17/062,794, filed Oct. 5, 2020, which is a continuation of U.S. patent application Ser. No. 16/217,166, filed Dec. 12, 2018, which claims the benefit of U.S. Provisional Application No. 62/611,308, filed Dec. 28, 2017, and U.S. Provisional Application No. 62/613,317, filed Jan. 3, 2018, all of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 18 is an example diagram depicting the list of information elements as per an aspect of an embodiment of the present disclosure.

FIG. 19 is an example diagram depicting the definition of a service type/application type information element as per an aspect of an embodiment of the present disclosure.

FIG. 20 is an example diagram depicting the definition of a device type information element as per an aspect of an embodiment of the present disclosure.

FIG. 23 is a flow diagram of an aspect of an embodiment of the present disclosure.

DETAILED DESCRIPTION OF EXAMPLES

Figure 1:
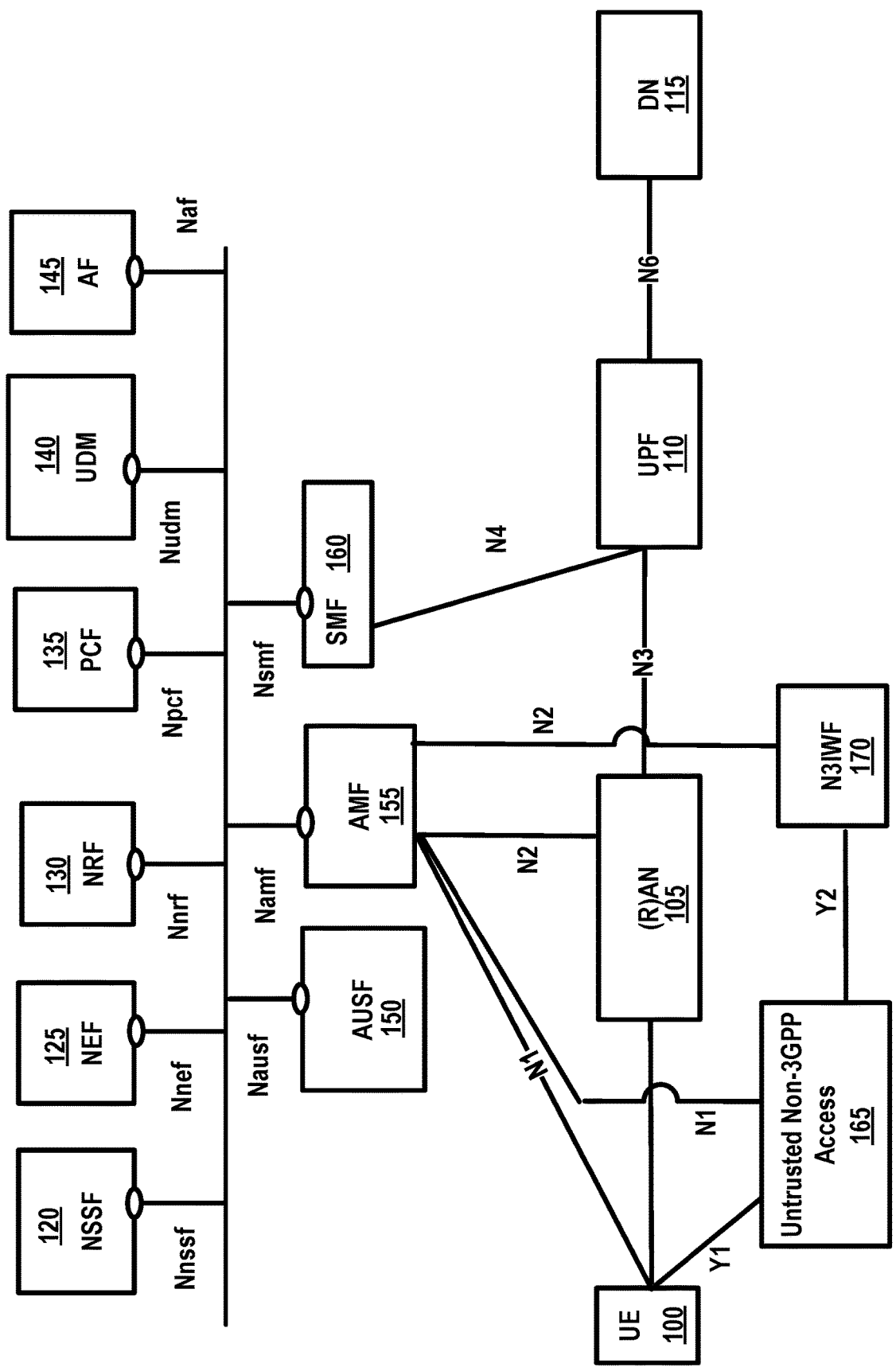
FIG. 1 is a diagram of an example 5G system architecture as per an aspect of an embodiment of the present disclosure.

Example embodiments of the present invention enable implementation of enhanced features and functionalities in 5G systems and 4G systems. More particularly, the embodiments of the technology disclosed herein may relate to service type based policy and charging control; and the embodiments of the technology disclosed herein may relate to device type based policy and charging control. Throughout the present disclosure, UE, wireless device, and mobile device are used interchangeably. Throughout the present disclosure, base station, evolved Node B (eNB or eNodeB) are used interchangeably. Throughout the present disclosure, base station, (Radio) Access Network ((R)AN), Next Generation Radio Access Network (NG-RAN), New radio Node B (gNB), Next Generation eNodeB (ng-eNB s) are used interchangeably.

The following acronyms are used throughout the present disclosure:

| | |
|---|---|
| 4G | 4th generation mobile networks |
| 5G | 5th generation mobile networks |
| 5GC | 5G Core Network |
| 5GS | 5G System |
| 5G-AN | 5G Access Network |
| 5QI | 5G QoS Indicator |
| AF | Application Function |
| AMBR | Aggregate Maximum Bit Rate |
| AMF | Access and Mobility Management Function |
| AN | Access Network |
| APN | Access Point Name |
| ARP | Allocation and Retention Priority |
| BBERF | Bearer Binding and Event Reporting Function |
| CDR | Charging Data Record |
| CCNF | Common Control Network Functions |
| CN | Core Network |
| CP | Control Plane |
| DPI | Deep Packet Inspection |
| DL | Downlink |
| DN | Data Network |
| DN-AAA | Data Network Authentication Authorization and Accounting |
| DNN | Data Network Name |
| eNB | evolved Node B |
| eNodeB | evolved Node B |
| ESP | Encapsulating Security Payload |
| EPS | Evolved Packet System |
| E-UTRAN | Evolved Universal Terrestrial Radio Access Network |
| gNB | NR NodeB |
| GW | Gateway |
| HSS | Home Subscriber Server |
| IETF | Internet Engineering Task Force |
| IoT | Internet of things |
| IP | Internet Protocol |
| IP-CAN | IP Connectivity Access Network |
| L2 | Layer 2 (data link layer) |
| L3 | Layer 3 (network layer) |
| LADN | Local Area Data Network |
| LGW | Local Gateway |
| LI | Lawful Intercept |
| MEC | Mobile Edge Computing |
| MICO | Mobile Initiated Connection Only |

-continued

| | |
|---|---|
| MIoT | Mobile Internet of Things |
| MME | Mobility Management Entity |
| MTC | Machine Type Communication |
| N3IWF | Non-3GPP InterWorking Function |
| NAI | Network Access Identifier |
| NAS | Non Access Stratum |
| NEF | Network Exposure Function |
| NF | Network Function |
| NR | New Radio |
| NG-RAN | NR Radio Access Network |
| NRF | Network Repository Function |
| NSI | Network Slice Instance |
| NSSAI | Network Slice Selection Assistance Information |
| NSSF | Network Slice Selection Function |
| OCS | Online Charging System |
| OFCS | Offline Charging System |
| PCC | Policy and Charging Control |
| PCEF | Policy and Charging Enforcement Function |
| PCF | Policy Control Function |
| PCRF | Policy and Charging Rules Function |
| PDCP | Packet Data Convergence Protocol |
| PDN | Packet Data Network |
| PDU | Protocol Data Unit |
| PEI | Permanent Equipment Identifier |
| PGW | PDN Gateway |
| PLMN | Public Land Mobile Network |
| PMIP | Proxy Mobile IP |
| RAN | Radio Access Network |
| RB | Radio Bearer |
| RFC | Request For Comments |
| RLC | Radio Link Control |
| RRC | Radio Resource Control |
| RM | Registration Management |
| SBA | Service Based Architecture |
| SCM | Security Context Management |
| SDAP | Service Data Adaptation Protocol |
| SDU | Service Data Unit |
| SEA | Security Anchor Function |
| SGW | Serving Gateway |
| SIPTO | Selected IP Traffic Offload |
| SMF | Session Management Function |
| SMSF | SMS Function |
| SN | Sequence Number |
| S-NSSAI | Single Network Slice Selection Assistance information |
| SRB | Signaling Radio Bearer carrying control plane data |
| SUPI | Subscriber Permanent Identifier |
| TDF | Traffic Detection Function |
| TA | Tracking Area |
| TAI | Tracking Area Identity |
| TCP | Transmission Control Protocol |
| UDM | Unified Data Management |
| UDP | User Datagram Protocol |
| UE | User Equipment |
| UE | Uplink |
| UL CL | Uplink Classifier |
| UPF | User Plane Function |

Figure 2:
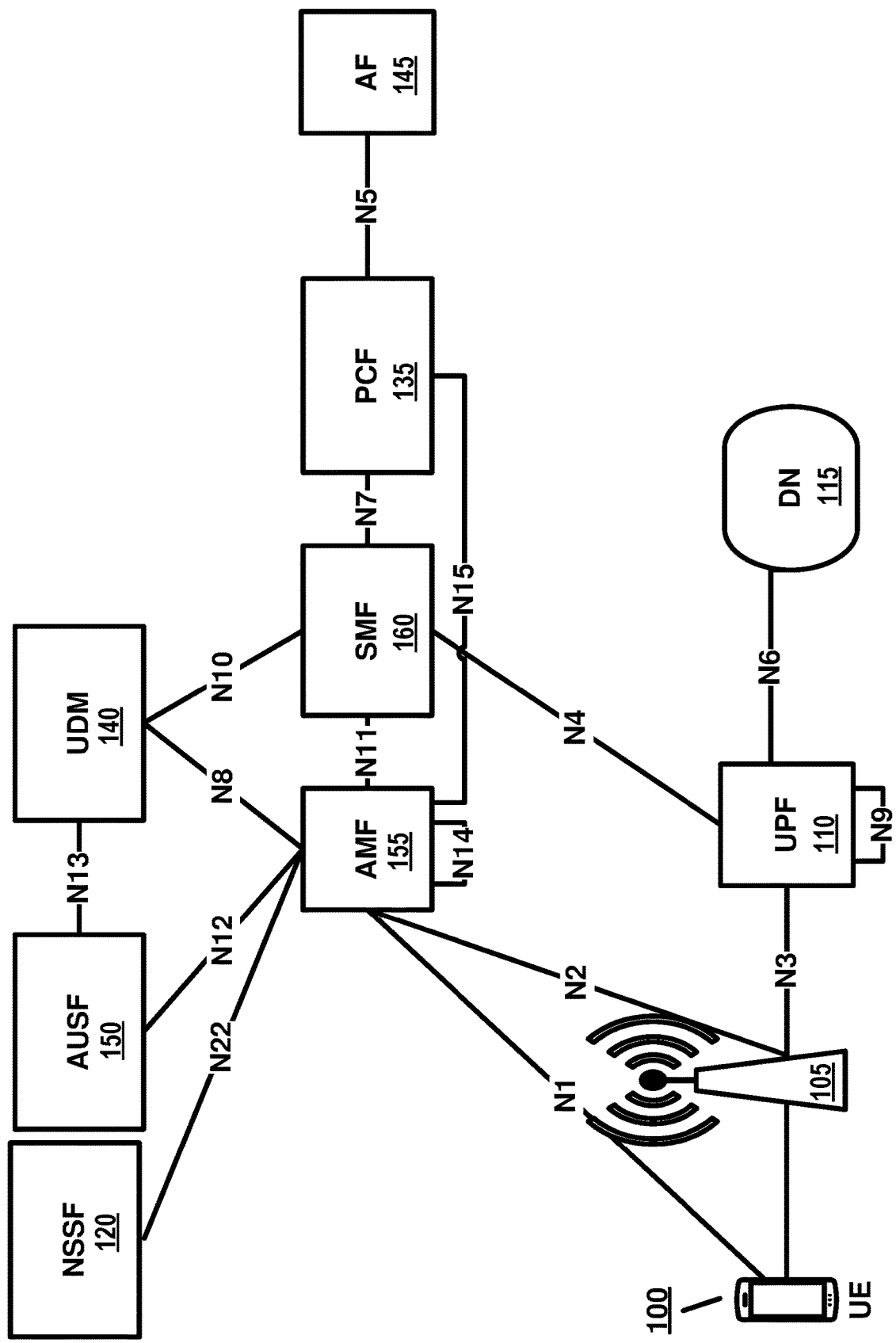
FIG. 2 is a diagram of an example 5G System architecture as per an aspect of an embodiment of the present disclosure.

Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
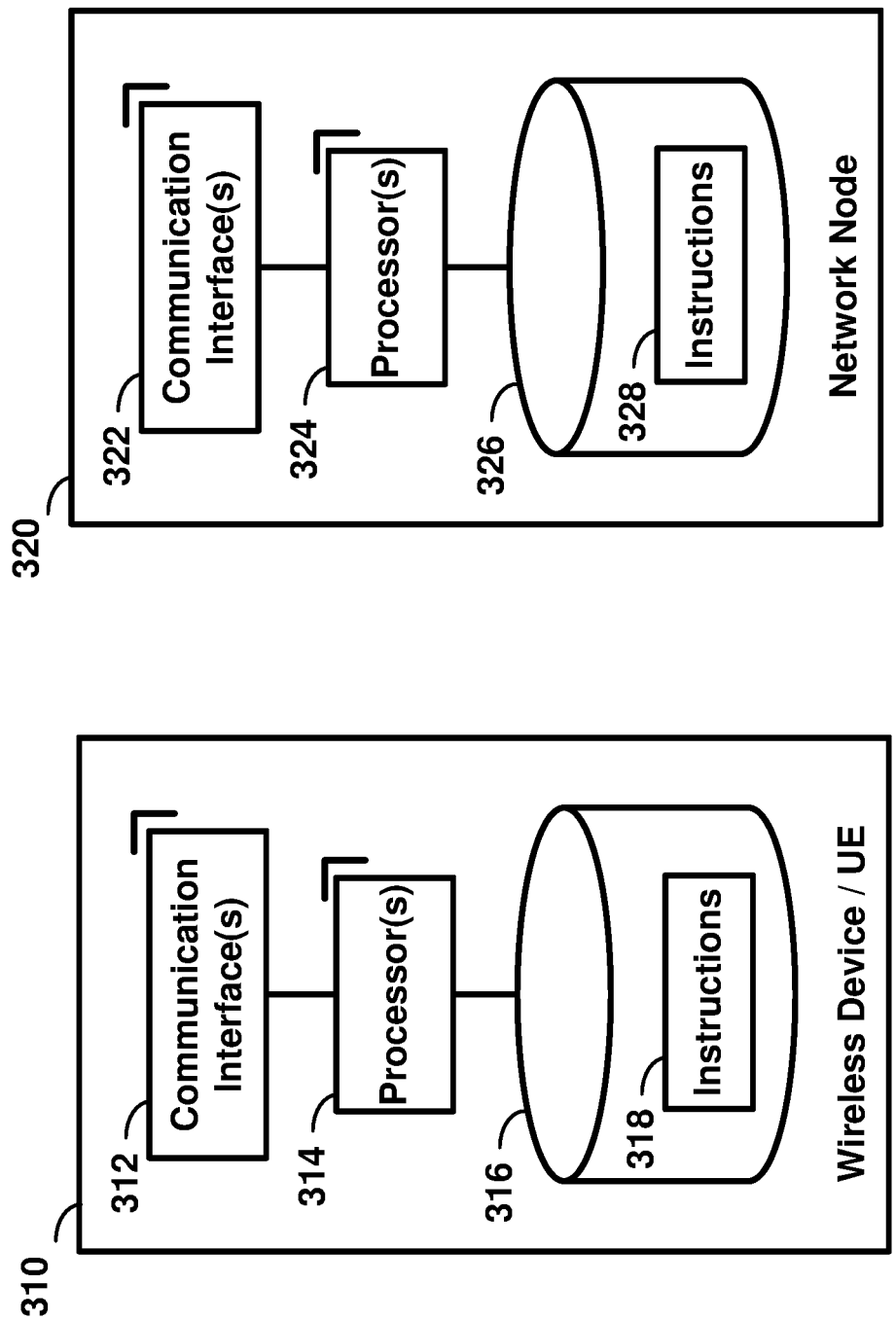
FIG. 3 is a system diagram of an example wireless device and a network node in a 5G system as per an aspect of an embodiment of the present disclosure.
Figure 4:
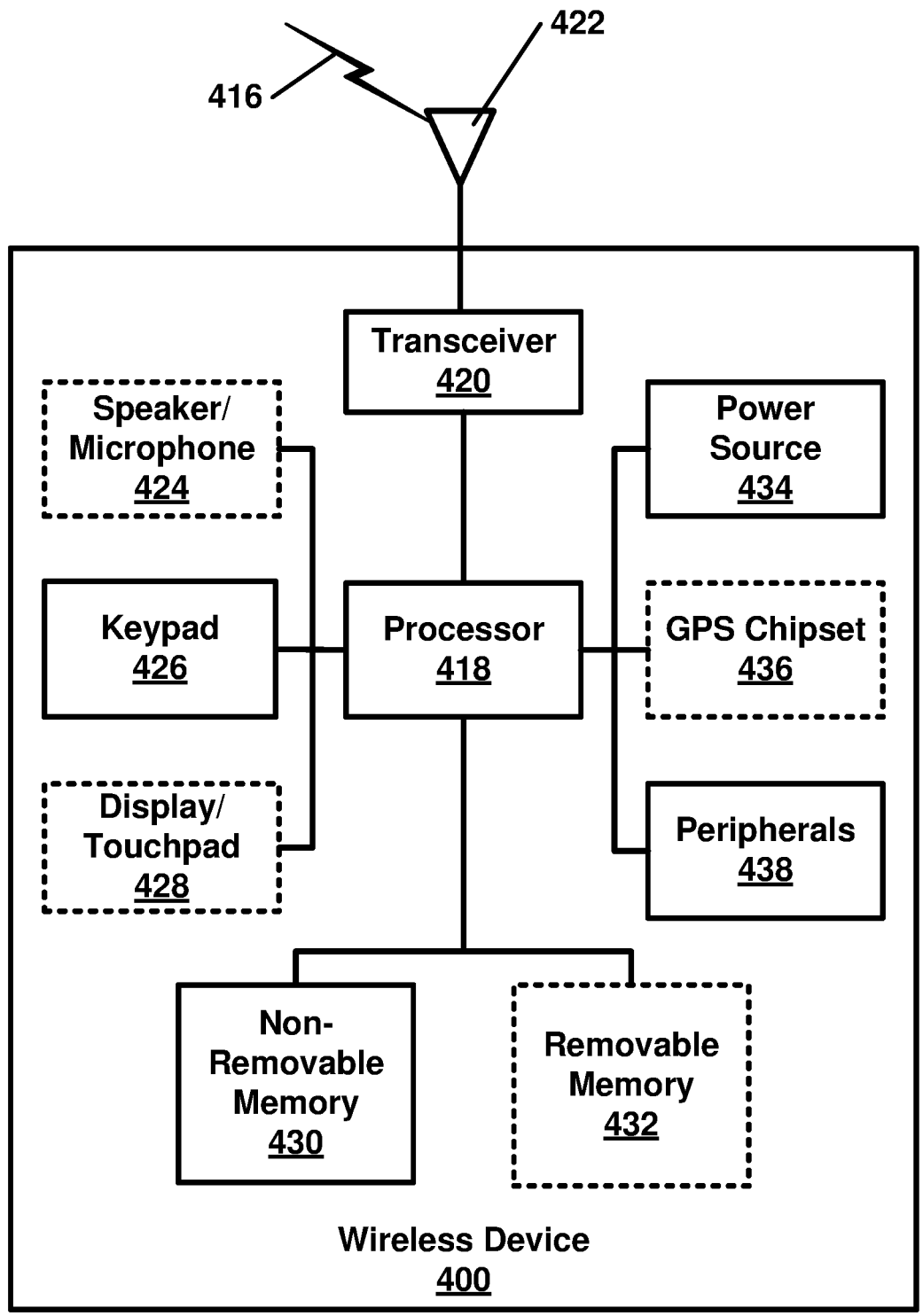
FIG. 4 is a system diagram of an example wireless device as per an aspect of an embodiment of the present disclosure.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may be employed once PDU session is established. IPv6 prefix allocation may be supported via IPv6 stateless autoconfiguration, if IPv6 is supported. IPv6 parameter configuration via stateless DHCPv6 may be supported.

The 5GC may support the allocation of a static IPv4 address and/or a static IPv6 prefix based on subscription information in the UDM 140 or based on the configuration on a per-subscriber, per-DNN basis.

User plane function(s) (UPF(s) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; The N3IWF 170 may terminate the IKEv2/IPsec protocols with the UE 100 over NWu and may relay over N2 the information needed to authenticate the UE 100 and authorize its access to the 5G core network; Termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Un-trusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in example FIG. 5, the registration management, RM may be employed to register or de-register a UE/user 100 with the network, and establish the user context in the network. Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8:
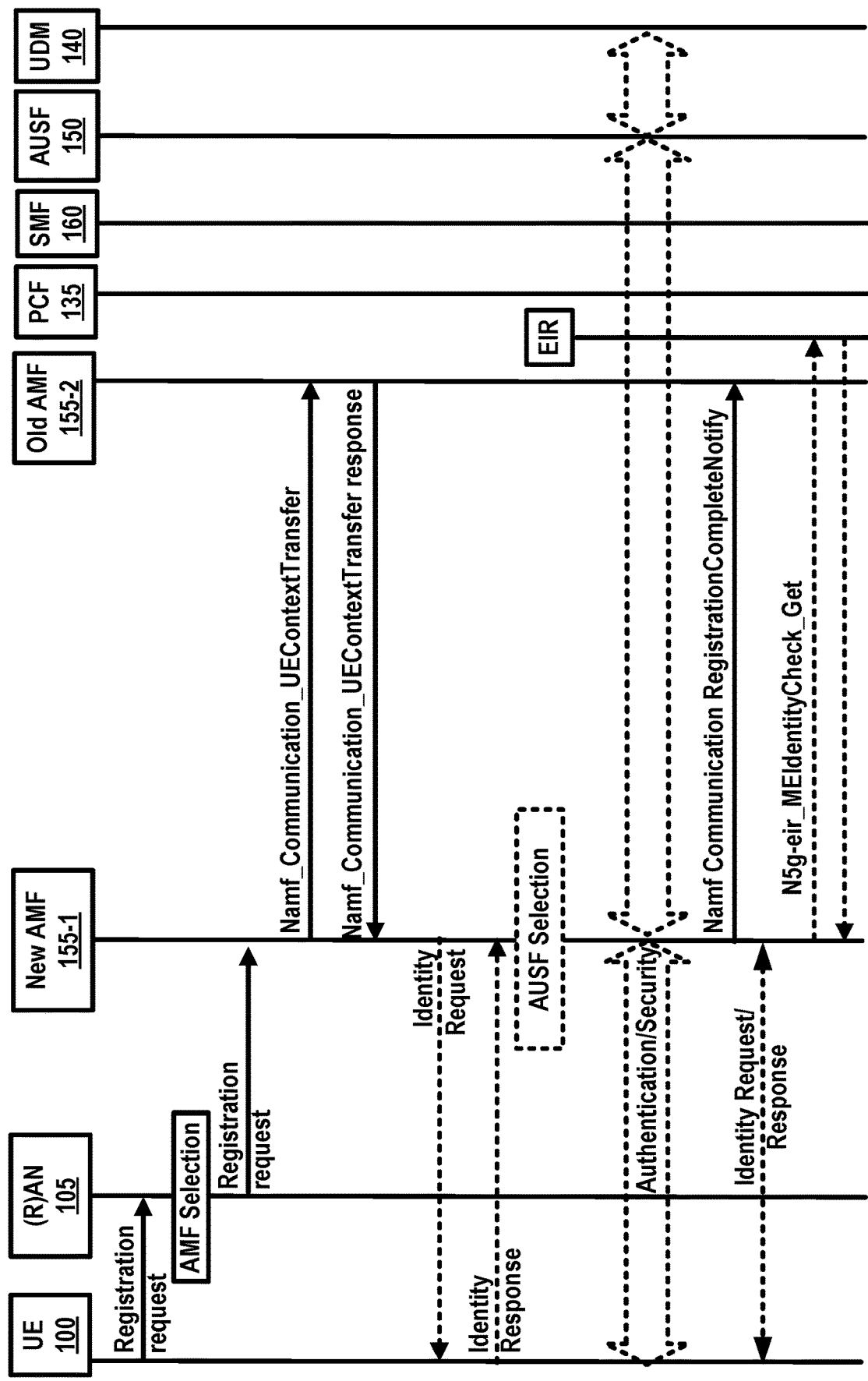
FIG. 8 and FIG. 9 are example call flows for UE registration procedure as per an aspect of an embodiment of the present disclosure.
Figure 9:
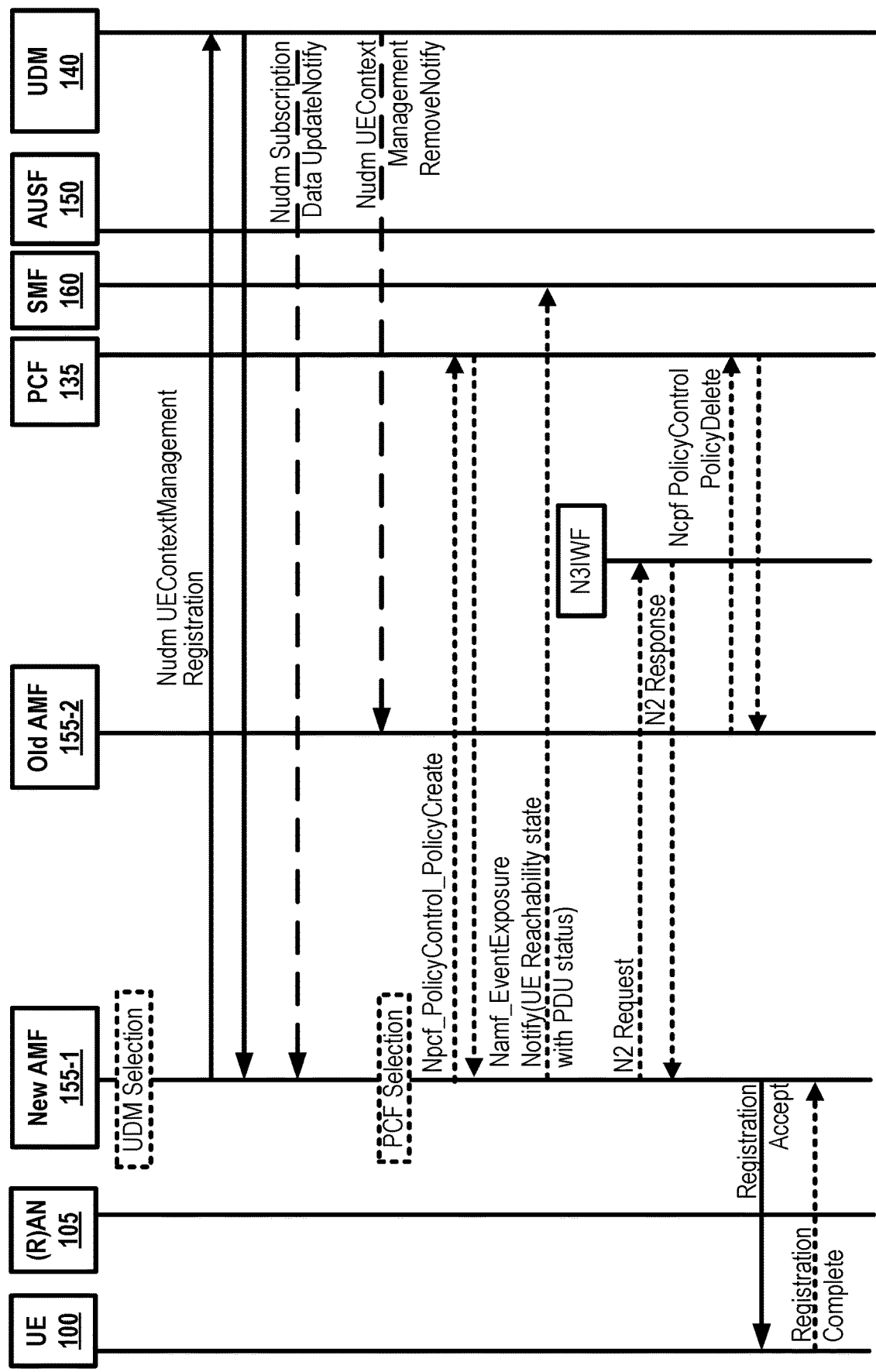

The initial registration procedure as depicted in example FIG. 8 and FIG. 9 may involve execution of network access control functions (e.g. user authentication and access authorization based on subscription profiles in UDM 140). As result of the registration procedure, the identity of the serving AMF 155 may be registered in UDM 140.

The registration management, RM procedures may be applicable over both 3GPP access 105 and non 3GPP access 165.

Figure 5:
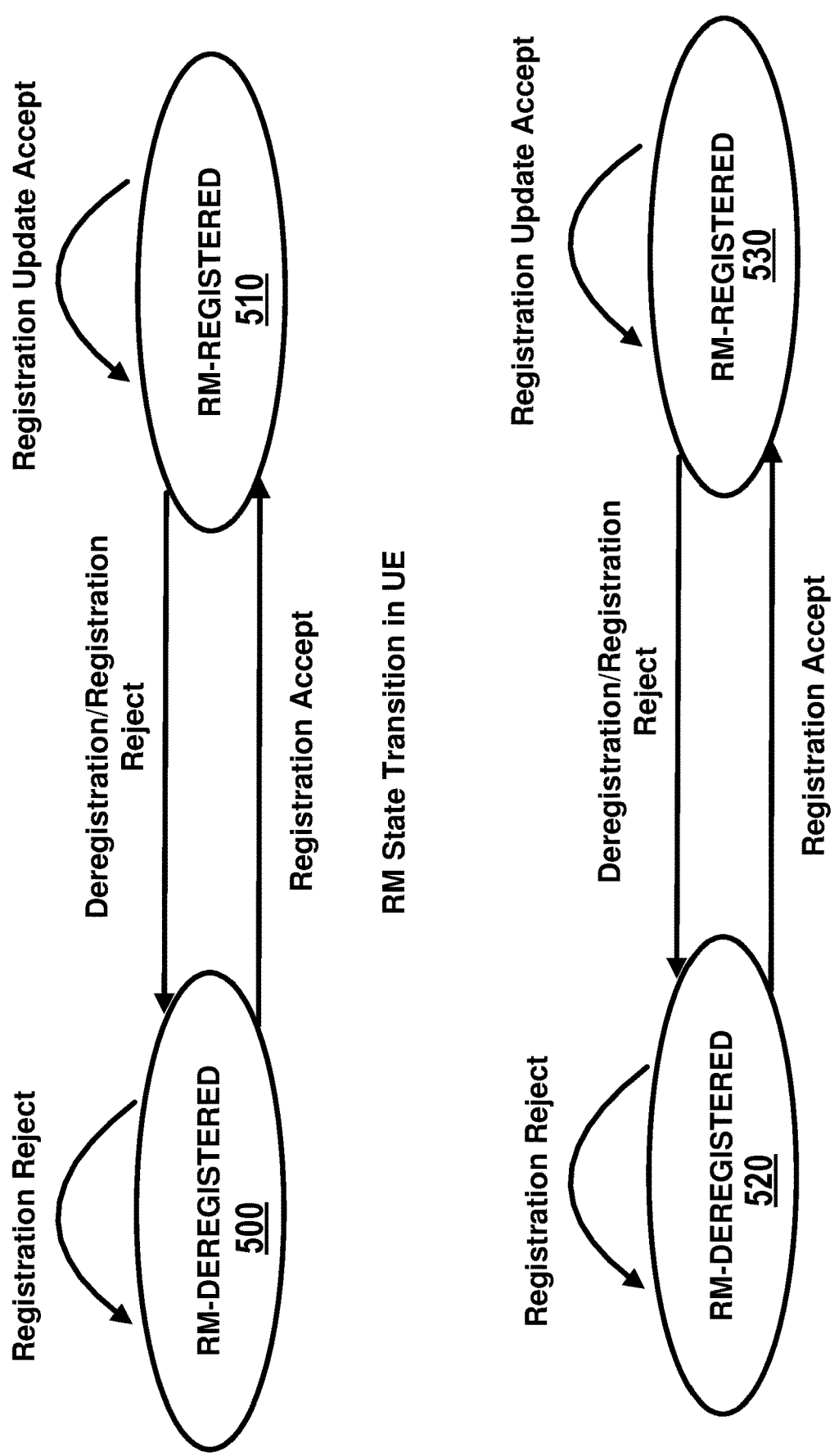
FIG. 5 depicts two registration management state models in UE 100 and AMF 155 as per an aspect of an embodiment of the present disclosure.

An example FIG. 5 depicts the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

Figure 6:
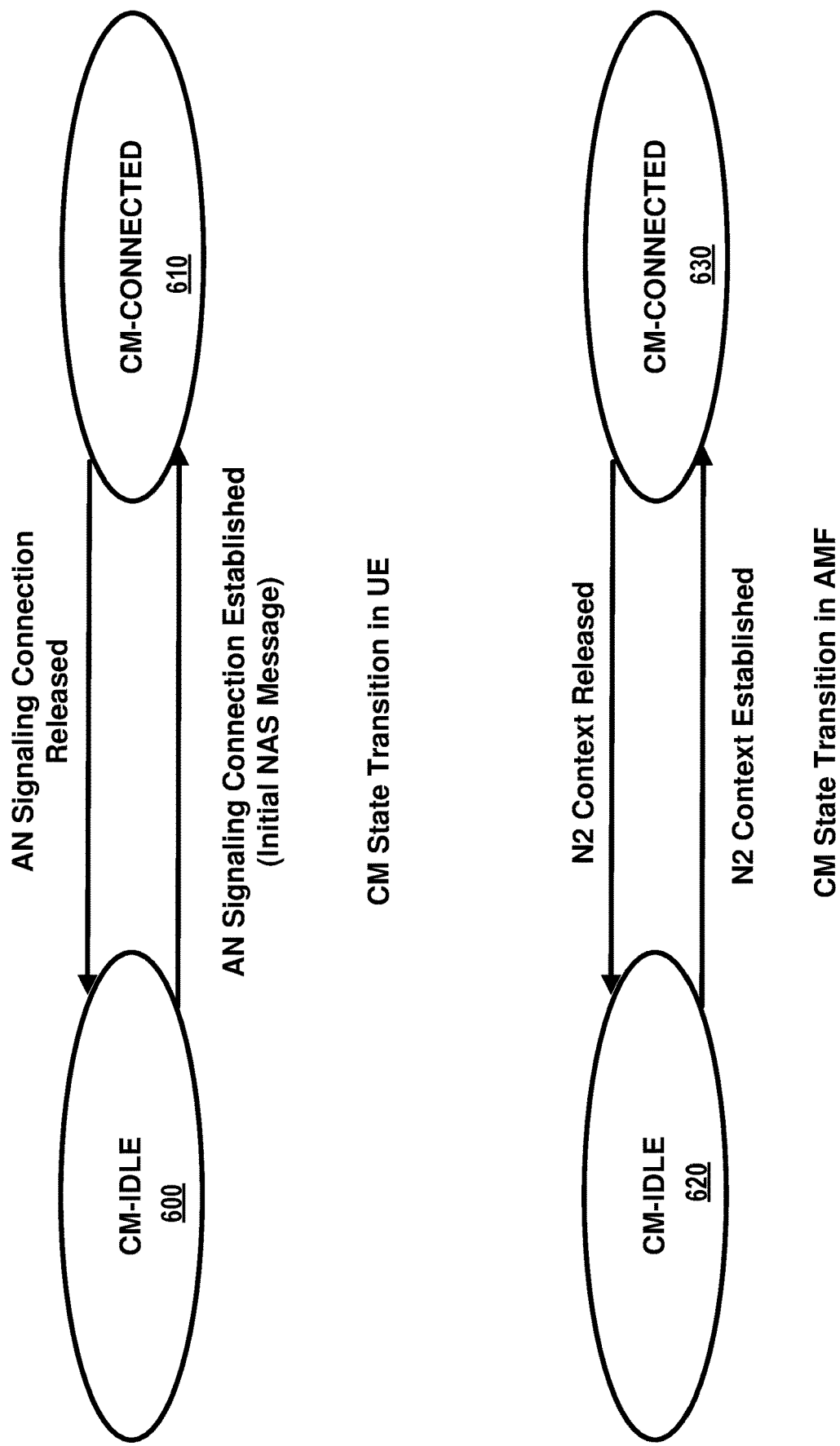
FIG. 6 depicts two connection management state models in UE 100 and AMF 155 as per an aspect of an embodiment of the present disclosure.

As shown in example FIG. 6, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in example FIG. 6, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish a NAS signaling connection for a UE 100 in CM-IDLE 600 state. The procedure of releasing a NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
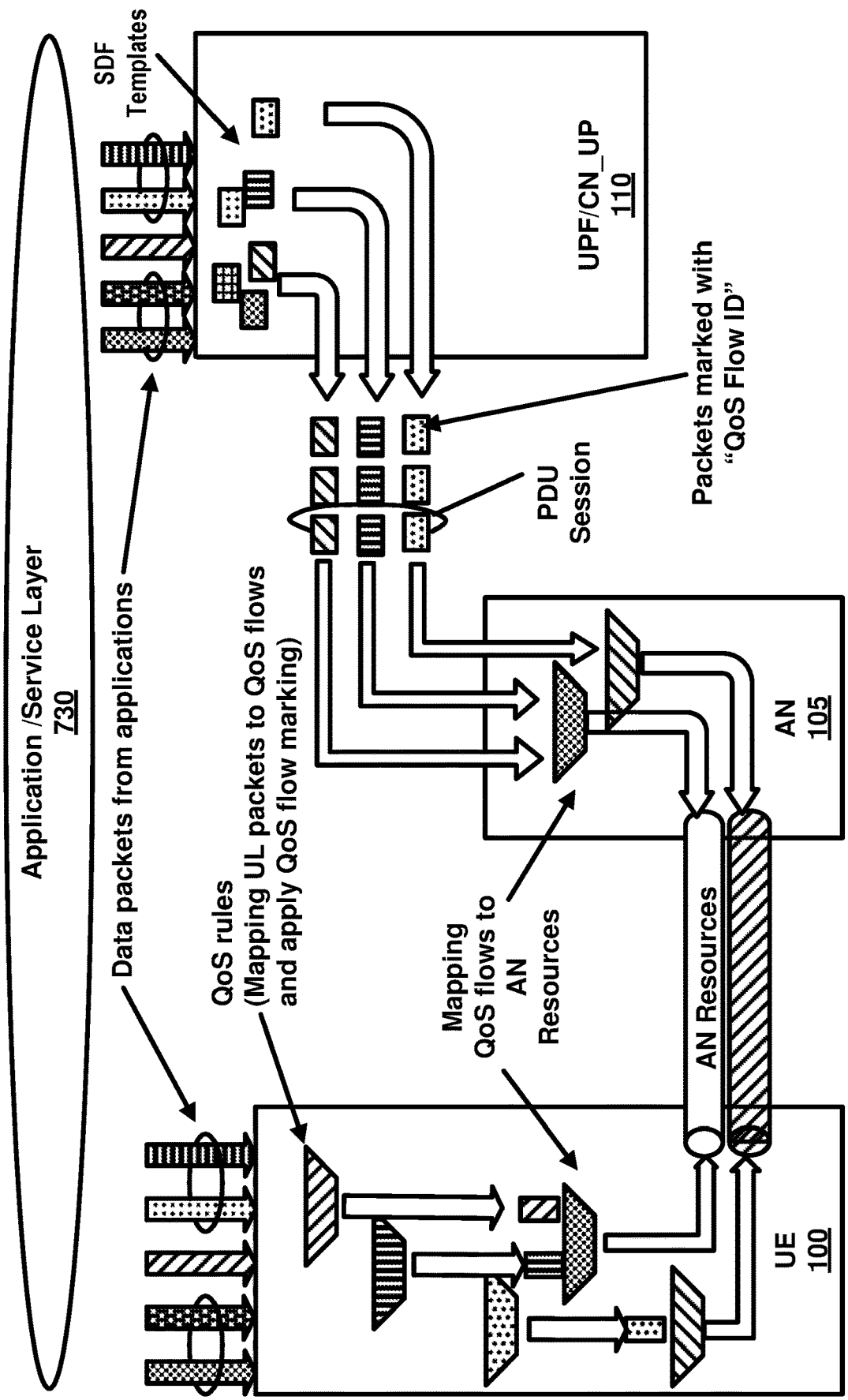
FIG. 7 is diagram for classification and marking traffic as per an aspect of an embodiment of the present disclosure.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may support reflective QoS. The QoS model may comprise flow mapping or packet marking at the UPF (CN_UP) 110, AN 105 and/or UE 100. Packets may arrive from and/or destined to the application/service layer 730 of UE 100, UPF (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like.).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) comprises of at least two steps. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system furthermore may support a unified authentication framework, stateless NFs, where the compute resource is decoupled from the storage resource, capability exposure, and concurrent access to local and centralized services. To support low latency services and access to local data networks, UP functions may be deployed close to the access network.

A 5G system may support roaming with both home routed traffic as well as local breakout traffic in the visited PLMN. An example 5G architecture may be service-based and the interaction between network functions may be represented in two ways. (1) FIG. 1 is an example service-based representation, where network functions within the control plane, may enable other authorized network functions to access their services. This representation may include point-to-point reference points where necessary. (2) FIG. 2 is an example reference point representation, showing the interaction between the NF services in the network functions described by point-to-point reference point (e.g. N11) between any two network functions.

Figure 10:
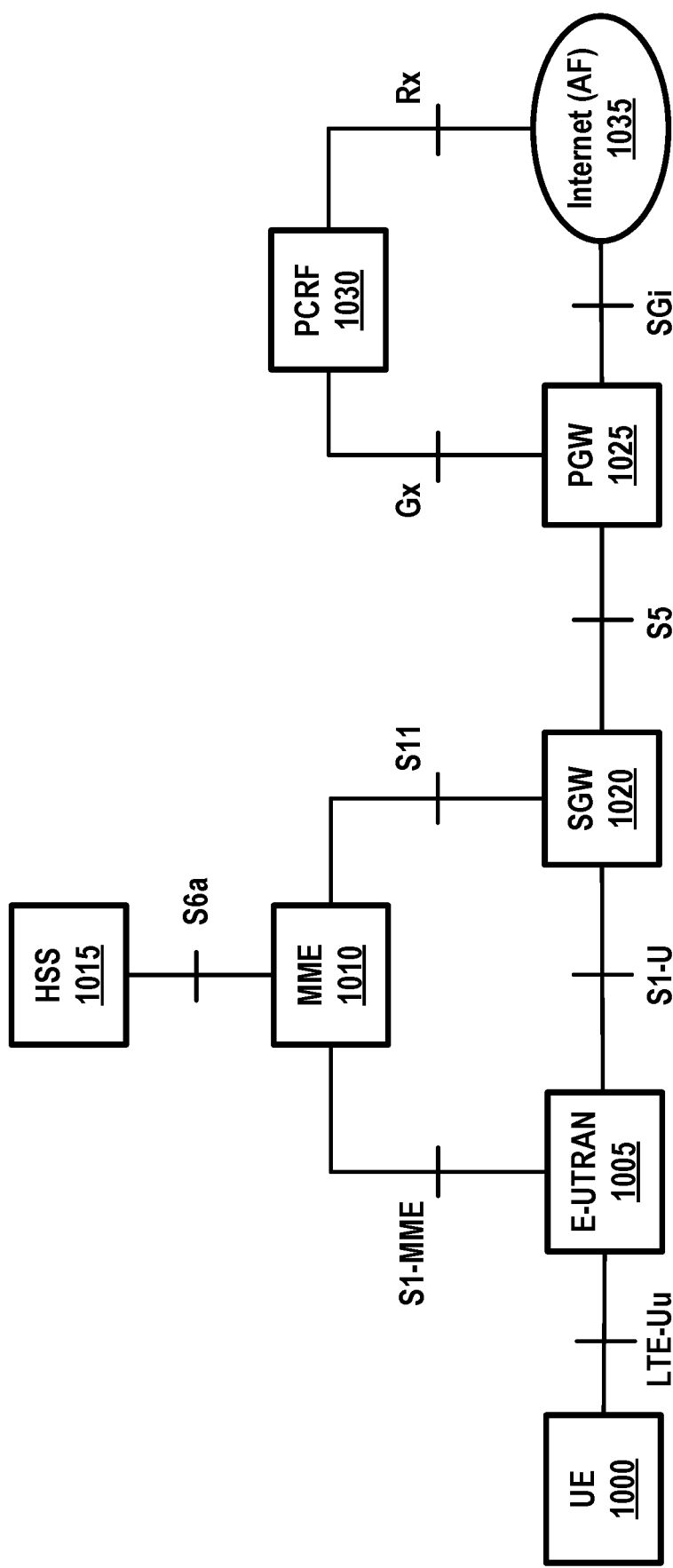
FIG. 10 is an example diagram of non-roaming 4G architecture for 3GPP accesses as per an aspect of an embodiment of the present disclosure.

FIG. 10 is an example diagram of non-roaming 4G architecture for 3GPP accesses.

E-UTRAN 1005 may be an access network, and may have the function of Header compression and user plane ciphering, UL and DL bearer level admission control, UE-AMBR enforcement, etc.

MME 1010 may have the function of NAS signaling, mobility management, session management, PDN GW and Serving GW selection, etc.

HSS 1015 may be a database that contains user-related and subscriber-related information. It may provide supporting functions in mobility management, call and session setup, user authentication and access authorization.

SGW 1020 may be a gateway which terminates the user plane interface towards the E-UTRAN. It may be the functionality of mobility anchoring for inter-3GPP mobility, and may have the function of packet routing and forwarding, and accounting for inter-operator charging, etc.

PGW 1025 may be a gateway which terminates the SGi interface towards the PDN. It may comprise the function of per-user based packet filtering (by e.g. deep packet inspection), UE IP address allocation, and policy enforcement (e.g. QoS policy and charging policy enforcement).

PCRF 1030 may be the policy and charging control element. It may make the QoS policy, charging policy and gating policy and send the policies to the PCEF(PGW) 1025 for enforcement.

AF 1035 may be the application function, and it may provide the application related information to the PCRF 1030 for policy decision.

Figure 11:
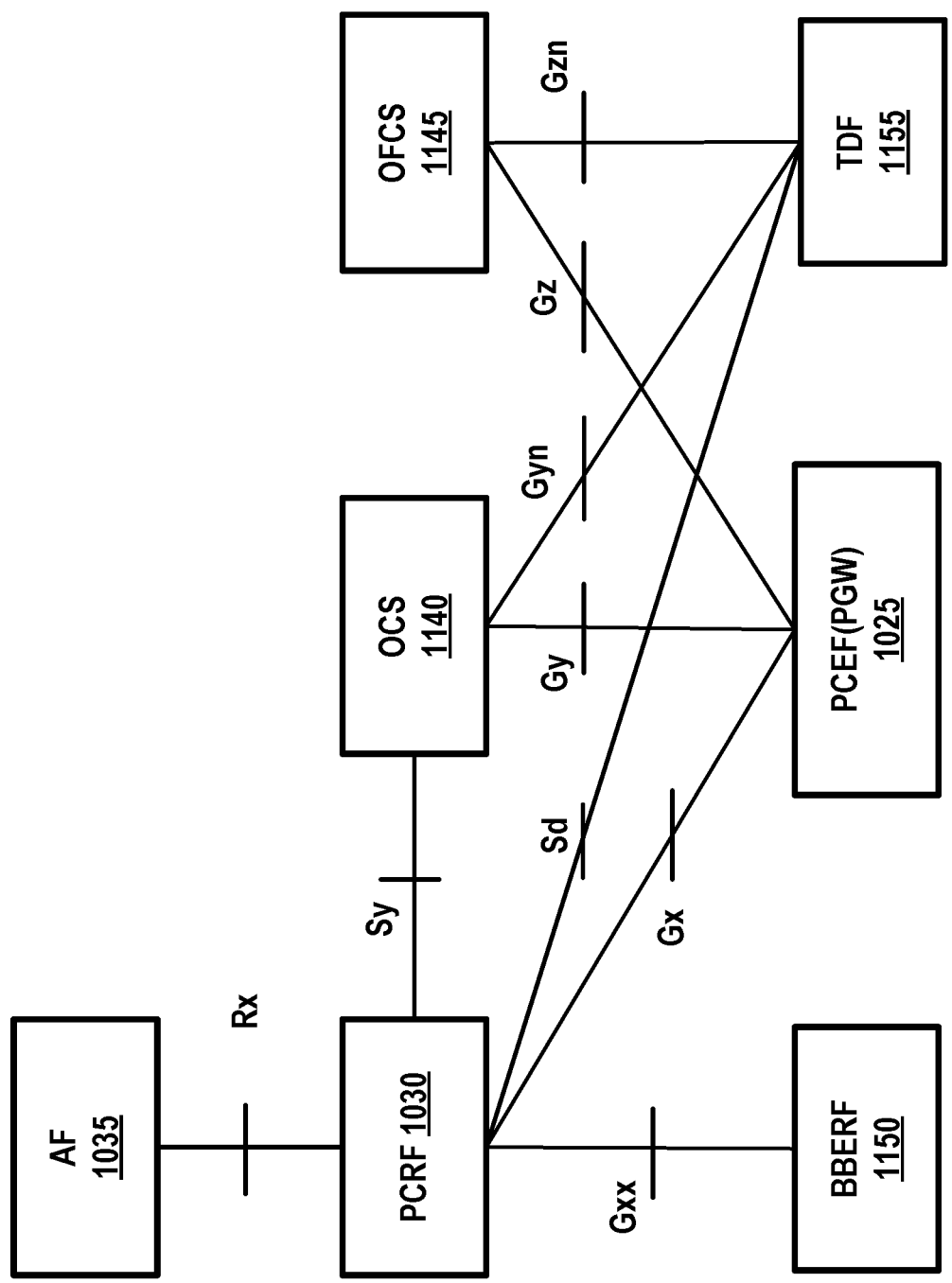
FIG. 11 is an example diagram of policy and charging control architecture as per an aspect of an embodiment of the present disclosure.

FIG. 11 is an example diagram of policy and charging control architecture.

PCEF 1025 may be located in a PGW, and it mainly enforces the policy (e.g. QoS policy, charging policy and gating) received from the PCRF 1030.

BBERF 1150 may be located in a SGW or non-3GPP access, and it may be used for PMIP-based S5/S8 or non-3GPP access scenario and enforce the QoS policy received from a PCRF.

TDF 1155 may be the traffic detection function, and may be used for the application detection with the DPI function.

OCS 1140 may be the online charging system, and may interact with the PGW 1025 or TDF 1155 to provide the online charging function.

OFCS 1145 may be the offline charging system, and may interact with the PGW 1025 or TDF 1155 to provide the offline charging function.

Implementation of the existing technologies may have issues in supporting specific services/applications, e.g. machine type communications, ultra-reliable low-latency communications, or Vehicle-to-Vehicle communications. The existing technologies may use the PCEF (PGW) to detect the application and report the detected application to the PCRF for charging policy. The existing technologies may use the PCEF (PGW) to detect the application and report the detected application to the PCRF for policy (s) (e.g. QoS policy, gating policy, traffic steering policy). To implement the existing application detection, the PCEF (PGW) may detect and analysis every user plane packet, if a first policy and charging rule matched, the PCEF may report the detected application to a PCRF, the PCRF may send a second policy and charging rule to the PCEF for further enforcement. The existing application detection may have the impact on the performance of the PCEF (PGW). The existing application detection mechanism may need more signaling interaction between the PCEF and the PCRF. Example embodiments provides the enhanced mechanisms to support specific service/application-based charging. Example embodiments provides the enhanced mechanisms to support specific service/application-based policy control. Example embodiments provides the enhanced mechanisms to have less impact on the performance of the PCEF. Example embodiments provides the enhanced mechanisms to have less signaling interaction between the PCEF and the PCRF.

Implementation of the existing technologies may have issues in supporting specific device type, e.g. Internet of Things (IoT) device; Vehicle device; and/or cell phone. The existing technologies may have the issue supporting the device type based charging. The existing technologies may have the issue supporting the device type based policy control. Example embodiments provides the enhanced mechanisms to support device type-based charging. Example embodiments provides the enhanced mechanisms to support device type based policy control. The device type based charging and/or device type based policy control enable an operator to implement charging and/or policy control (e.g. QoS) for different user with different device type.

Example 1

Figure 12:
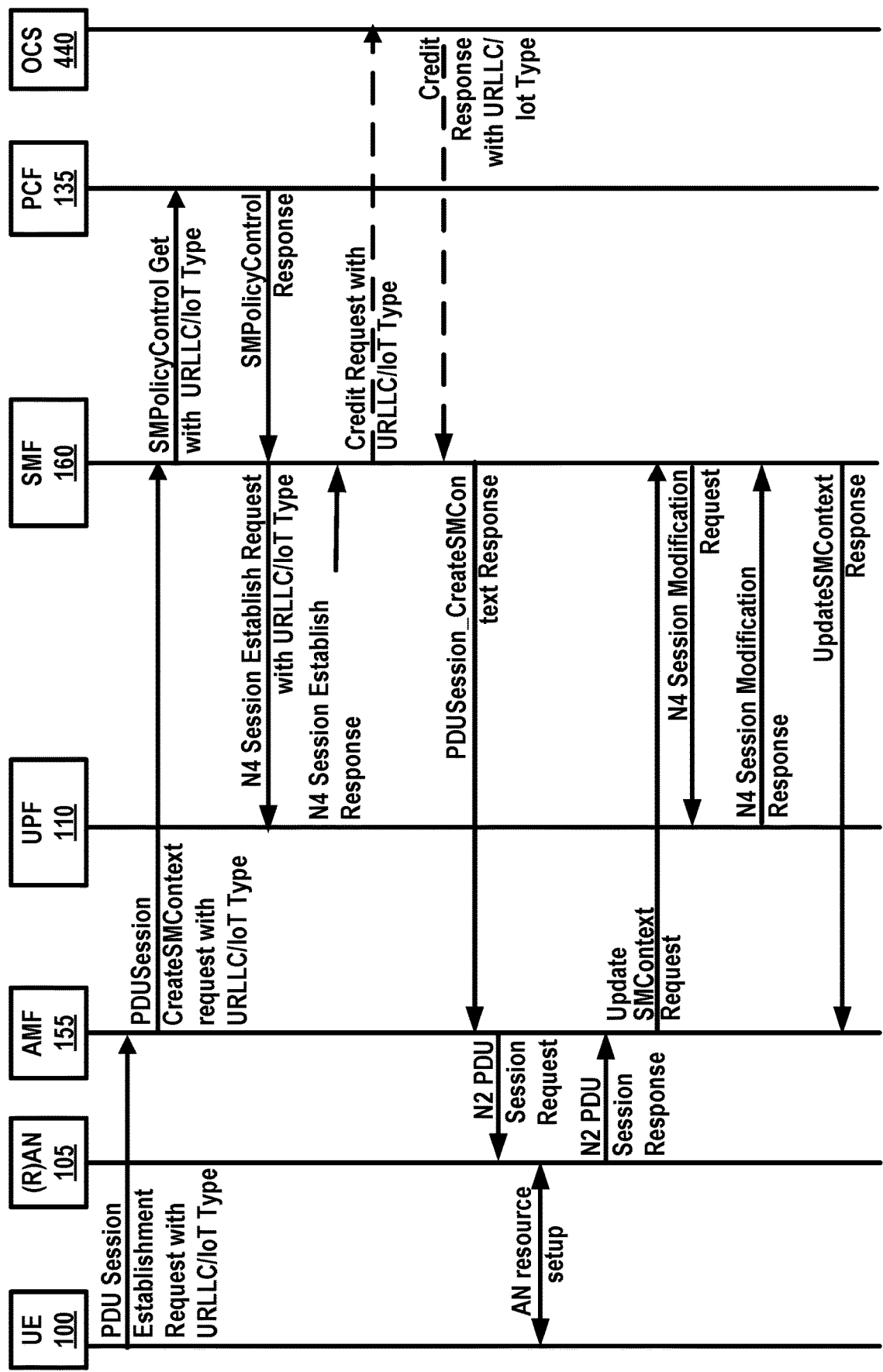
FIG. 12 is an example call flow diagrams as per an aspect of an embodiment of the present disclosure.

In an example, a UE may send a first message to a network node (e.g. AMF). The first message may comprise service type/application type, and/or device type. The PCF may determine the charging policy based on the service type/application type, and/or device type. The SMF may perform charging based on the service type. FIG. 12 shows an example call flow which may comprise one or more actions.

A UE may send to AMF 155 a NAS Message comprising at least one of S-NSSAI, DNN, PDU Session ID, Request type, and/or N1 SM container (PDU Session Establishment Request). The UE 100 may initiate a UE requested PDU session establishment procedure by the transmission of a NAS message containing a PDU session establishment request within the N1 SM container. The PDU session establishment request may comprise a PDU Type (e.g. Ethernet), SSC mode, Protocol Configuration Options, and/or a PDU session ID generated by the UE. NAS Message and/or N1 SM container may comprise one or more information. In an example, NAS Message and/or N1 SM container may comprise a service type/application type. The service type/application type may be used to indicate the service applied to the PDU session, and the service type/application type may comprise at least one of the following service/application: machine type communications (MTC); ultra-reliable low-latency communications (URLLC); Vehicle-to-X communications (V2X); Internet of Things (IoT); or an application type for packed data service (e.g. 8K UHD 8K UHD video). In an example, NAS Message and/or N1 SM container may comprise a device type. The device type may be used to indicating the type of the wireless device; and the device type may comprise at least one of the following device: Internet of Things (IoT) device; Vehicle device; Cell phone; Wearable device; Sensor for industry automation; and other devices. As an example, the value of Wearable device and Sensor for industry automation may be used as specific type of IoT device. In an example, NAS Message and/or N1 SM container may comprise a user identity of a wireless device. In an example, NAS Message and/or N1 SM container may comprise an APN for the PDN session. FIG. 19 may be an example of the definition of the service type/application type, and FIG. 20 may be an example of the definition of the device type. As an example, the NAS Message and/or N1 SM container may comprise a URLLC service type and/or an IoT device type.

In response to the message received from the UE 100, the AMF 155 may take one or more actions. In an example action, the AMF 155 may select an SMF based on the service type/application type and/or the device type, as an example, the AMF 155 may select an SMF 160 close to the user to meet the requirement of URLLC service. In an example action, the AMF 155 may send to the SMF 160 a message, e.g. PDUSession_CreateSMContext Request comprising at least one of: SUPI, DNN, S-NSSAI, PDU Session ID, AMF ID, Request Type, N1 SM container (PDU Session Establishment Request), User location information, Access Type, PEI). The message sent to SMF 160 may comprise the service type/application type (e.g. URLLC) and/or the device type (IoT) received from the UE 100.

In response to the message received from the AMF 155, the SMF 160 may send to a PCF (e.g. PCF 135) an SMPolicyControl_Get message to establish a PDU Session with the PCF 135 and get the default PCC Rules for the PDU Session. The message sent to PCF 135 may comprise the service type/application type (e.g. URLLC) and/or the device type (IoT) received from the AMF 155. In response to the message received from the SMF 160, the PCF 135 may take one or more actions. In an example action, the PCF 135 may make the charging policy decision based on the information received from the SMF 160 (e.g. service type/application type (e.g. URLLC) and/or the device type (IoT)) and/or other information (e.g. subscription information); as an example, the PCF 135 may make one or more of the following charging policy decision: online charging for the URLLC service and/or IoT devices; and increased charging rate for the URLLC service and/or IoT devices. In an example action, the PCF 135 may send to the SMF 160 a message (e.g. SMPolicyControl_Response) by providing the charging policy (s) applied to the service type/application type (e.g. URLLC) and/or the device type (IoT) related service data flow (a) and/or PDU session(s);

In response to the message received from the PCF 135, the SMF 160 may take one or more actions. In an example action, the SMF 160 may select an UPF based on the service type/application type and/or the device type, as an example, the SMF 160 may select an UPF 110 close to the user to meet the requirement of URLLC service. In an example action, the SMF 160 may send to the UPF 110 a message (e.g. N4 session establishment/modification Request) to establish/modify the user plane session. The message may comprise the usage reporting rule for charging. If CN Tunnel Info is allocated by the SMF 160, the SMF 160 may send the CN Tunnel Info to UPF 110 in this step. The CN Tunnel Info may comprise address(es) of UPF 110 and/or tunnel ID for N3 tunnel corresponding to the PDU Session, where the N3 tunnel may be between the (R)AN 105 and the UPF 110. The UPF 110 may acknowledge SMF 160 by sending an N4 session establishment/modification response. If CN Tunnel Info is allocated by the UPF 110, the UPF 110 may send the CN Tunnel Info to SMF 160 in this step.

The SMF 160 may send to an OCS 1140 a message (e.g. Credit Request) to request the credit for: the service type/application type (e.g. URLLC); and/or the device type (e.g. IoT); and/or the PDU session; and/or the wireless device. In response to the message received from the SMF 160, the OCS 1140 may take one or more actions. In an example action, the OCS 1140 may make a charging credit decision based on the information received from the SMF 160 (e.g. service type/application type (e.g. URLLC) and/or the device type (IoT)) and/or other information (e.g. subscription information); as an example, the OCS 1140 may take one or more of charging credit decisions. In an example charging credit decisions, the OCS 1140 may allocate a small number of units (e.g. data volume, time) and/or determining a higher charging rate for the URLLC service. In an example charging credit decisions, the OCS 1140 may allocate a large number of units (e.g. data volume, time) and/or determining a flat rate for the IoT devices. In an example action, the OCS 1140 may send to the SMF 160 a response message (e.g. Credit Response) by providing the granted charging credit units and/or policy (s) applied to the service type/application type (e.g. URLLC); and/or the device type (IoT); and/or the PDU session; and/or the wireless device.

In response to the message received from the AMF 155, the SMF 160 may send to the AMF 155 a PDUSession_CreateSM Response message comprising at least one of: Cause, N2 SM information (PDU Session ID, QoS Profile(s), CN Tunnel Info, S-NSSAI, Session-AMBR), and/or N1 SM container (PDU session establishment accept (QoS Rule, SSC mode, S-NSSAI, allocated IPv4 address, Session-AMBR)). In response to the message received from the SMF 160, the AMF 155 may send to (R)AN 105 an N2 PDU session request message comprising N2 SM information, and/or NAS message, and the NAS message may comprise at least one of: PDU Session ID, and/or N1 SM container (PDU session establishment accept). In response to the message received from the AMF 155, the (R)AN 105 may send to UE 100: AN specific signaling that is related with the information received from SMF 160. (R)AN 105 may allocate (R)AN N3 tunnel information for the PDU Session.

(R)AN 105 may forward to the UE 100 the NAS message (PDU Session ID, N1 SM container (PDU Session Establishment Accept)). (R)AN 105 may send the NAS message to the UE 100 if the RAN resources have been established and the allocation of (R)AN tunnel information have been successful. The (R)AN 105 may send to the AMF 155 an N2 PDU session response message comprising at least one of: PDU Session ID, Cause, and/or N2 SM information (PDU Session ID, (R)AN Tunnel Info, list of accepted/rejected QoS profile(s)). The (R)AN Tunnel Info corresponds to the Access Network address of the N3 tunnel corresponding to the PDU Session. In response to the message received from the (R)AN 105, the AMF 155 may send to SMF 160 a UpdateSMContext Request (N2 SM information). The AMF 155 may forward the N2 SM information received from (R)AN 105 to the SMF 160.

In response to the message received from the AMF 155, the SMF 160 may take one or more actions. In an example action, the SMF 160 may derive the usage reporting rule for charging based on the granted charging credit units and/or policy (s) received from the OCS 1140. In an example action, the SMF 160 may send to the UPF 110 a message (e.g. N4 session establishment/modification request) comprising one or more of the following information: usage reporting rule for charging; and AN Tunnel Info and CN Tunnel Info. In response to the message received from the SMF 160, the UPF 110 may send an N4 session establishment/modification response to the SMF 160. With the usage reporting rule for charging, the UPF may perform the service flow detection and usage reporting for: the service type/application type (e.g. URLLC); and/or the device type (IoT); and/or the PDU session; and/or the wireless device. In response to the message received from the AMF 155, the SMF 160 may send to the AMF 155 a UpdateSMContext Response (Cause) message.

Example 2

Figure 13:
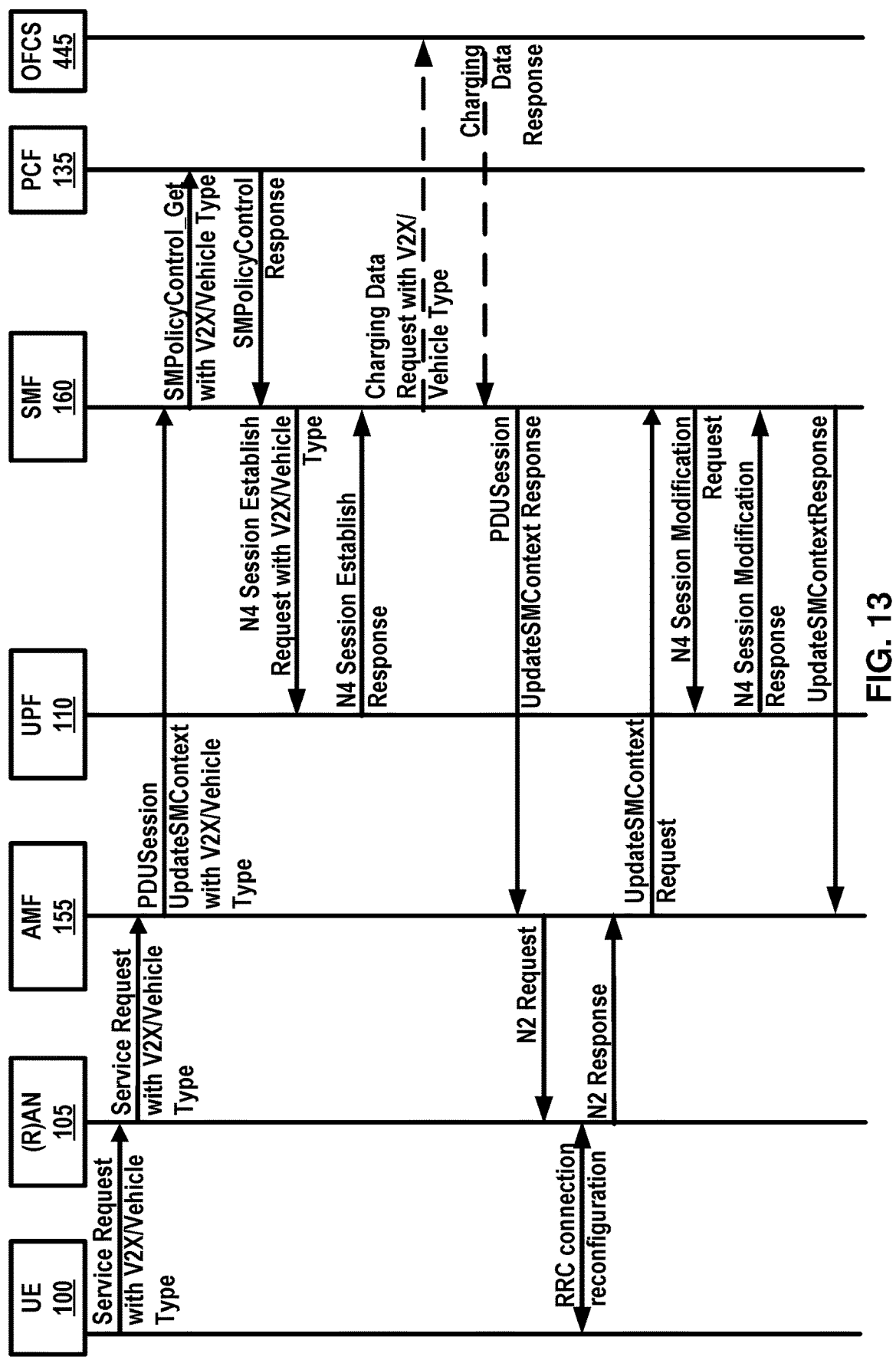
FIG. 13 is an example call flow diagrams as per an aspect of an embodiment of the present disclosure.

In an example, a UE may initiate a service request procedure, a service request message may comprise a V2X service type/application type and/or a Vehicle device type. FIG. 13 shows an example call flow which may comprise one or more actions.

A UE 100 may send to a (R)AN 105 an AN message comprising at least one of: AN parameters, and/or MM NAS Service Request (PDU Session(s) to be activated, security parameters, PDU Session status). In case of NG-RAN, the AN parameters may comprise Establishment cause. The Establishment cause provides the reason for requesting the establishment of an RRC connection. In case of NG-RAN, the UE 100 may send NAS Service Request message towards the AMF 155 encapsulated in an RRC message to the RAN, and the RRC message(s) that may be used to carry the 5G-GUTI and this NAS message. The message sent to (R)AN 105 may comprise a service type/application type (e.g. V2X) and/or a device type (e.g. Vehicle). In response to the message received from the UE 100, the (R)AN 105 may send to an AMF 155 an N2 Message comprising at least one of: N2 parameters, MM NAS Service Request, the service type/application type (e.g. V2X) and/or the device type (e.g. Vehicle). When NG-RAN is used, the N2 parameters may comprise the 5G-GUTI, Location information, RAT type and Establishment cause. Based on the PDU Session status, the AMF 155 may initiate PDU Session release procedure for the PDU Sessions whose PDU Session ID(s) were indicated by the UE as not available.

In response to the message received from the (R)AN 105, the AMF 155 may send to an SMF 160 a PDUSession_UpdateSMContext Request message comprising at least one of: PDU Session ID(s), Cause(s), UE location information, Access Type, the service type/application type (e.g. V2X) and/or the device type (e.g. Vehicle). The PDUSession_UpdateSMContext Request may be invoked if the UE 100 identifies PDU Session(s) to be activated in the MM NAS Service Request message. In response to the message received from the AMF 155, the SMF 160 may invoke the SMPolicyControl_Get operation to get the charging policy (s) for the service type/application type (e.g. V2X) and/or the device type (e.g. Vehicle), and/or the PDU Session (s). The message sent to PCF 135 may comprise the service type/application type (e.g. V2X) and/or the device type (e.g. Vehicle).

In response to the message received from the SMF 160, the PCF 135 may take one or more actions. In an example action, the PCF 135 may make the policy decision based on the information received from the SMF 160 (e.g. service type/application type (e.g. V2X) and/or the device type (e.g. Vehicle) information) and/or other information (e.g. subscription information); and as an example, the PCF 135 may make one or more charging policy decisions. In an example charging policy decision, the PCF 135 may determine an offline charging for the URLLC V2X service type/application type and/or Vehicle device type. In an example charging policy decision, the PCF 135 may determine a flat rate for the V2X service type/application type and/or Vehicle device type. In an example action, the PCF 135 may send to the SMF 160 a message (e.g. SMPolicyControl_Response) by providing the charging policy (s) applied to the service type/application type (e.g. V2X) and/or the device type (e.g. Vehicle) related service data flow(s) and/or the PDU session(s).

In response to the message received from the PCF 135, the SMF 160 may take one or more actions. In an example action, the SMF 160 may select an UPF based on the service type/application type and/or the device type, as an example, the SMF 160 may select an UPF 110 close to the user to meet the requirement of V2X service. In an example action, the SMF 160 may send to the UPF 110 a message (e.g. N4 session establishment/modification Request) to establish/modify the user plane session. The message may comprise the usage reporting rule for charging. If CN Tunnel Info is allocated by the SMF 160, the SMF 160 may send to the UPF 110 the CN Tunnel Info in this step. The CN Tunnel Info may comprise address(es) of UPF 110 and/or tunnel ID for N3 tunnel corresponding to the PDU Session, where the N3 tunnel may be between the (R)AN 105 and the UPF 110.

In response to the message received from the SMF 160, the UPF 110 may acknowledge SMF 160 by sending an N4 session establishment/modification response. If CN Tunnel Info is allocated by the UPF 110, the UPF 110 may send to the SMF 160 the CN Tunnel Info in this step. Based on the charging policy received from the PCF 135 and/or local configuration, the SMF 160 may send to an OFCS 1145 a message (e.g. Charging Data Request) for charging applied for: the service type/application type (e.g. V2X); and/or the device type (Vehicle); and/or the PDU session; and/or the wireless device.

In response to the message received from the SMF 160, the OFCS 1145 may take one or more actions. In an example action, the OFCS 1145 may perform the charging based on the information received from the SMF 160 (e.g. service type/application type (e.g. V2X) and/or the device type (Vehicle)) and/or other information (e.g. subscription information); as an example, the OFCS 1145 may take one or more charging, the OFCS 1145 may determine a flat rate for the V2X service type/application type and/or Vehicle devices. In an example action, the OFCS 1145 may send to the SMF 160 a response message (e.g. Charging Data Response). In response to the message received from the AMF 155, the SMF 160 may send to the AMF 155 a PDUSession_UpdateSMContext Response comprising N1 SM information (PDU Session ID (s), PDU Session re-establishment indication), and/or N2 SM information (PDU Session ID (s), QoS profile, CN N3 Tunnel Info, S-NSSAI), Cause).

In response to the message received from the SMF 160, the AMF 155 may send to (R)AN 105 an N2 PDU session request message comprising N2 SM information, and/or NAS message, and the NAS message may comprise at least one of: PDU Session ID, and/or N1 SM container (PDU session establishment accept). In response to the message received from the AMF 155, the (R)AN 105 may send to UE 100: AN specific signaling that is related with the information received from SMF 160. (R)AN 105 may allocate (R)AN N3 tunnel information for the PDU Session.

(R)AN 105 may forward to the UE 100 the NAS message (PDU Session ID, N1 SM container (PDU Session Establishment Accept)). (R)AN 105 may send the NAS message to the UE 100 if the RAN resources have been established and the allocation of (R)AN tunnel information have been successful. The (R)AN 105 may send to the AMF 155 an N2 PDU session response message comprising at least one of: PDU Session ID, Cause, and/or N2 SM information (PDU Session ID, (R)AN Tunnel Info, list of accepted/rejected QoS profile(s)). The (R)AN Tunnel Info corresponds to the Access Network address of the N3 tunnel corresponding to the PDU Session. In response to the message received from the (R)AN 105, the AMF 155 may send to SMF 160 a UpdateSMContext Request (N2 SM information). The AMF 155 may forward the N2 SM information received from (R)AN 105 to the SMF 160.

In response to the message received from the AMF 155, the SMF 160 may take one or more actions. In an example action, the SMF 160 may derive the usage reporting rule for charging. In an example action, the SMF 160 may send to the UPF 110 a message (e.g. N4 session establishment/modification request) comprising one or more of the following information: usage reporting rule for charging; and AN Tunnel Info and CN Tunnel Info. In response to the message received from the SMF 160, the UPF 110 may send an N4 session establishment/modification response to the SMF 160. With the usage reporting rule for charging, the UPF may perform the service flow detection and usage reporting for: the service type/application type (e.g. V2X); and/or the device type (Vehicle type); and/or the PDU session; and/or the wireless device. In response to the message received from the AMF 155, the SMF 160 may send to the AMF 155 a UpdateSMContext Response (Cause) message.

Example 3

Figure 14:
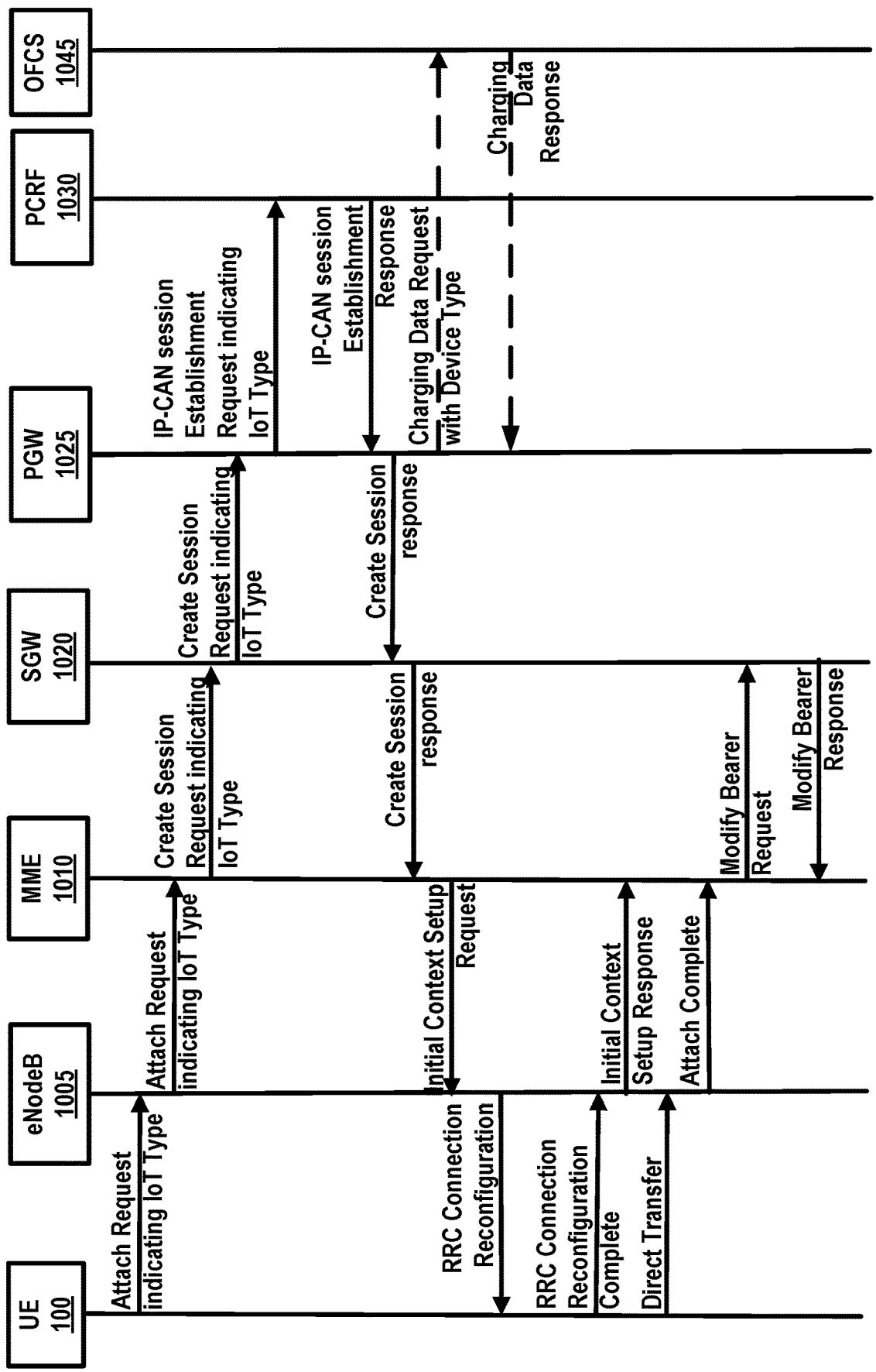
FIG. 14 is an example call flow diagrams as per an aspect of an embodiment of the present disclosure.

In an example, a UE may initiate attach procedure, the attach request message may comprise an IoT service type/application type. FIG. 14 shows an example call flow which may comprise one or more actions.

A UE may initiate attach procedure by sending to an eNodeB 1005 an attach request message comprising at least one of: IMSI or old GUTI, Old GUTI type, last visited TAI (if available), UE Core Network Capability, Attach Type, ESM message container, additional GUTI, P-TMSI signature, and/or MS Network Capability. The message may be together with RRC parameters indicating the Selected Network and the old GUMMEI. The attach request message may comprise a service type/application type (e.g. IoT). In response to the message received from the UE 100, the eNodeB 1005 may forward to an MME 1010 the received attach request message comprising the IoT service type/application type. In response to the message received from the eNodeB 1005, the MME 1010 may allocate a Bearer Id, select a gateway (e.g. SGW 1020), and send to the SGW 1020 a message, e.g. a create session request message comprising at least one of: service type/application type, IMSI, MME TEID for control plane, RAT type, PGW address, PDN Address, Default EPS Bearer QoS, PDN Type, subscribed APN-AMBR, APN, EPS Bearer Id, and/or Protocol Configuration Options). In response to the message received from the MME 1010, the SGW 1020 may create a new entry in its EPS Bearer table and store the information received from the MME 1010 (e.g. service type/application type), and may send to a PGW 1025 a Create Session Request message comprising at least one of: service type/application type, IMSI, Serving GW Address for the user plane, Serving GW TEID of the user plane, Serving GW TEID of the control plane, RAT type, Default EPS Bearer QoS, PDN Type, PDN Address, subscribed APN-AMBR, APN and/or Bearer Id, wherein the address of the PGW/LGW 1025 (e.g. PGW address) has been received from the MME 1010. In response to the message received from the SGW 1020, the PGW 1025 may create a new entry in its EPS bearer context table, store the information received from the SGW 1020 (e.g. service type/application type), and generates a Charging Id for the Default Bearer. The new entry allows the PGW to route user plane PDUs between the S-GW and the packet data network (e.g. forward the traffic to a local network closed to the user based on the service type/application type information in the EPS bearer table or context when receiving an uplink data packet.). The PGW 1025 may send to a PCRF 1030 a message (e.g. IP-CAN session establishment request) to get the charging policy (s) for the service type/application (e.g. IoT), and/or IP-CAN session (s). The message sent to the PCRF 1030 may comprise the service type/application type (e.g. IoT) information received from the SGW 1020.

In response to the message received from the PGW 1025, the PCRF 1030 may take one or more actions. In an example action, the PCRF 1030 may make the charging policy decision based on the information received from the PGW 1025 (e.g. service type/application type (e.g. IoT) information) and/or other information (e.g. subscription information); and as an example, the PCRF 1030 may make one or more of the following charging policy decision: determining an offline charging for the IoT service type/application type; and determining a flat rate for the IoT service type/application type. In an example action, the PCRF 1030 may send to the PGW 1025 a message (e.g. IP-CAN session establishment response) by providing the charging policy (s) applied to the service type/application type (e.g. IoT) related service data flow(s) and/or IP-CAN session(s). Based on the charging policy received from the PCRF 1030 and/or local configuration, the PGW 1025 may send to an OFCS 1145 a message (e.g. Charging Data Request) for charging applied for: the service type/application type (e.g. IoT); and/or the IP-CAN session; and/or the wireless device.

In response to the message received from the PGW 1025, the OFCS 1145 may take one or more actions. In an example action, the OFCS 1145 may perform the charging based on the information received from the PGW 1025 (e.g. service type/application type (e.g. IoT)) and/or other information (e.g. subscription information); as an example, the OFCS 1145 may perform the following charging: applying a flat rate for the IoT service type/application type. In an example action, the OFCS 1145 may send to the PGW 1025 a response message (e.g. Charging Data Response).

In response to the message received from the SGW 1020, the PGW 1025 may return to the SGW 1020 a Create Session Response message comprising at least one of: PGW Address for the user plane, PGW TEID of the user plane, PGW TEID of the control plane, PDN Type, PDN Address, EPS Bearer Id, EPS Bearer QoS, Charging Id, and/or APN-AMBR). The PGW 1025 may correlate the PGW Address for the user plane and PGW TEID of the user plane, with the Serving GW Address for the user plane and Serving GW TEID of the user plane received from SGW 1020. The correlated information may be used as the user plane tunnel address between the SGW 1020 and the PGW 1025. In response to the message received from the PGW 1025, the SGW 1020 may correlate the Serving GW Address for the user plane and Serving GW TEID of the user plane, with the PGW Address for the user plane and PGW TEID of the user plane received from the PGW 1025. In response to the message received from the MME 1010, the SGW 1020 may response to the MME 1010 a Create Session Response message comprising at least one of: PDN Type, PDN Address, SGW address for User Plane, SGW TEID for User Plane, SGW TEID for control plane, EPS Bearer Id, EPS Bearer QoS, PGW/LGW address and TEID (GTP-based S5/S8) at the PGW for uplink traffic and/or APN-AMBR.

The MME 1010 may send to the eNodeB 1005 an Attach Accept message comprising at least one of: GUTI, TAI List, and/or Session Management Request (APN, PDN Type, PDN Address, EPS Bearer Identity, Protocol Configuration Options, Header Compression Configuration), and the message may be contained in an S1_MME control message Initial Context Setup Request. The S1-AP Initial Context Setup Request message may also comprise the EPS Bearer QoS, the UE-AMBR, EPS Bearer Identity, as well as the TEID at the Serving GW used for user plane and the address of the Serving GW for user plane. In response to the message received from the MME 1010, the eNodeB 1005 may take one or more actions. In an example action, the eNodeB 1005 may store the information received from the MME 1010. The eNodeB 1005 may use the SGW address for User Plane, SGW TEID for User Plane for the uplink data forwarding.

In an example action, the eNodeB 1005 may send to the UE 100 an RRC Connection Reconfiguration comprising EPS Radio Bearer Identity. In response to the message received from the eNodeB 1005, the UE 100 may response to the eNodeB 1005 an RRC Connection Reconfiguration Complete message.

In response to the message received from the UE 100, the eNodeB 1005 may send to the MME 1010 an Initial Context Response message. The Initial Context Response message may comprise the TEID of the eNodeB and the address of the eNodeB used for downlink traffic on the S1_U reference point. The eNodeB 1005 may correlate the TEID of the eNodeB and the address of the eNodeB, with the SGW address for User Plane and the SGW TEID for User Plane received from the MME 1010. The correlated information may be used as the user plane tunnel address between the eNodeB 1005 and the SGW 1020. The UE 100 may send a Direct Transfer message to the eNodeB 1005, which may comprise an Attach Complete (EPS Bearer Identity, NAS sequence number, NAS-MAC) message. In response to the message received from the UE 100, the eNodeB 1005 may forwards the Attach Complete message to the MME 1010 in an Uplink NAS Transport message. In response to the message received from the eNodeB 1005, the MME 1010 may send to SGW 1020 a Modify Bearer Request message comprising at least one of: EPS Bearer Identity, eNodeB address, eNodeB TEID, Handover Indication, and/or Presence Reporting Area Information. The SGW 1020 may correlate the TEID of the eNodeB and the address of the eNodeB, with the SGW address for User Plane and the SGW TEID for User Plane. In response to the message received from the MME 1010, the SGW 1020 may send to the MME 1010 a Modify Bearer Response comprising the EPS Bearer Identity. The SGW 1020 may then send its buffered downlink packets to the eNodeB 1005.

Example 4

Figure 15:
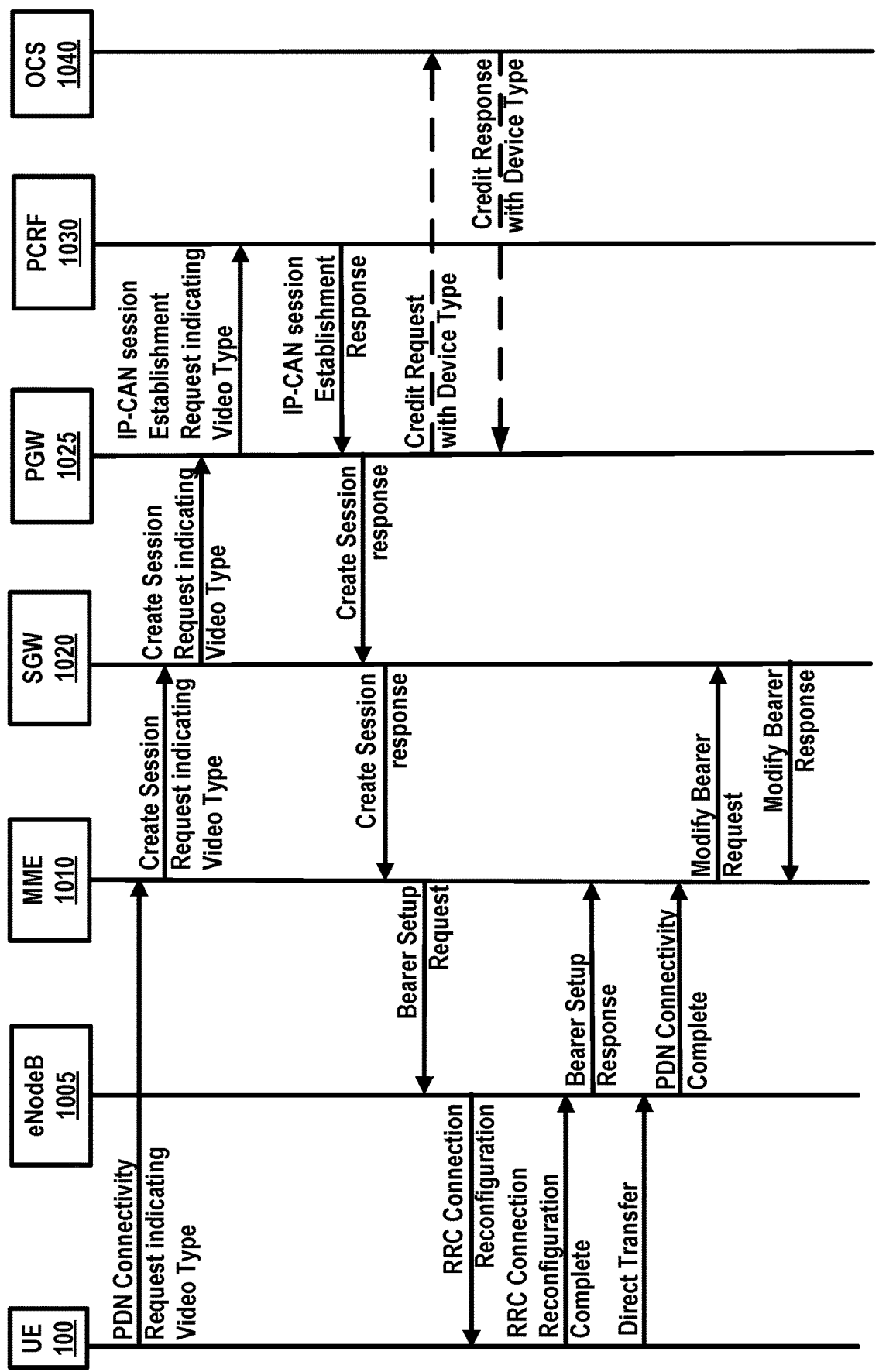
FIG. 15 is an example call flow diagrams as per an aspect of an embodiment of the present disclosure.

In an example, a UE may initiate PDN connectivity request, the PDN connectivity request message may comprise an 8K UHD video service type/application type. FIG. 15 shows an example call flow which may comprise one or more actions.

UE 100 may send to an MME 1010 a PDN connectivity request message comprising at least one of: APN, PDN Type, Protocol Configuration Options, Request Type, and/or Header Compression Configuration to establish a PDN session. The UE 400 may comprise the service type/application type in the PDN connectivity request, indicating the requested service/application applied to the PDN session. As an example, the PDN connectivity request may comprise the information elements as listed in FIG. 18. As an example, the definition of the service type/application type may be shown in FIG. 19. In response to the message received from the UE 100, the MME 1010 may perform the gateway selection, allocate a Bearer Id, and sends to the selected gateway (e.g. SGW 1020) a message (e.g. a create session request) comprising at least one of: service type/application type (e.g. 8K UHD video), IMSI, MME TEID for control plane, RAT type, PGW address, PDN Address, Default EPS Bearer QoS, PDN Type, subscribed APN-AMBR, APN, EPS Bearer Id, and/or Protocol Configuration Options. In response to the message received from the MME 1010, the SGW 1020 may create a new entry in its EPS Bearer table and store the information received from the MME 1010 (e.g. service type/application type), and may send to a PGW 1025 a Create Session Request message comprising at least one of: IMSI, Serving GW Address for the user plane, Serving GW TEID of the user plane, Serving GW TEID of the control plane, RAT type, Default EPS Bearer QoS, PDN Type, PDN Address, subscribed APN-AMBR, APN, and/or Bearer Id, wherein the address of the PGW 1025 (e.g. PGW address) has been received from the MME 1010. In response to the message received from the SGW 1020, the PGW 1025 may create a new entry in its EPS bearer context table, store the information received from the SGW 1020 (e.g. service type/application type), and generates a Charging Id for the Default Bearer. The new entry allows the PGW to route user plane PDUs between the S-GW and the packet data network (e.g. forward the traffic to a local network closed to the user based on the service type/application type information in the EPS bearer table or context when receiving an uplink data packet.). The PGW 1025 may send to a PCRF 1030 a message (e.g. IP-CAN session establishment request) to get the charging policy (s) for the service type/application (e.g. 8K UHD video), and/or IP-CAN session (s). The message sent to the PCRF 1030 may comprise the service type/application type (e.g. 8K UHD video) information received from the SGW 1020.

In response to the message received from the PGW 1025, the PCRF 1030 may take one or more actions. In an example action, the PCRF 1030 may make the charging policy decision based on the information received from the PGW 1025 (e.g. service type/application type (e.g. 8K UHD video) information) and/or other information (e.g. subscription information); and as an example, the PCRF 1030 may make one or more of the following charging policy decisions: determining an online charging for the 8K UHD video service type/application type; and determining a higher rate for the 8K UHD video service type/application type. In an example action, the PCRF 1030 may send to the PGW 1025 a message (e.g. IP-CAN session establishment response) by providing the charging policy (s) applied to the service type/application type (e.g. 8K UHD video) and/or the service type/application type related service data flow(s) and/or IP-CAN session (s). Based on the charging policy received from the PCRF 1030 and/or local configuration, the PGW 1025 may send to an OCS 1140 a message (e.g. Credit Request) comprising one or more of the following information: the service type/application type (e.g. 8K UHD video); the IP-CAN session ID; and the identity of wireless device (e.g. IMSI).

In response to the message received from the PGW 1025, the OCS 1140 may take one or more actions. In an example action, the OCS 1140 may make charging credit decision based on the information received from the PGW 1025 (e.g. service type/application type (e.g. 8K UHD video)) and/or other information (e.g. subscription information); as an example, the OCS 1140 may take one or more charging credit decisions, e.g. the OCS 1140 may allocate a big number of units (e.g. data volume, time) and/or determining a higher charging rate for the 8K UHD video service. In an example action, the OCS 1140 may send to the PGW 1025 a response message (e.g. Credit Response) by providing the granted charging credit units and/or policy (s) applied to the service type/application type (e.g. URLLC) related service data flow(s); and/or the IP-CAN session; and/or the wireless device. In response to the message received from the SGW 1020, the PGW 1025 may return to the SGW 1020 a Create Session Response message comprising at least one of: PGW Address for the user plane, PGW TEID of the user plane, PGW TEID of the control plane, PDN Type, PDN Address, EPS Bearer Id, EPS Bearer QoS, Charging Id, and/or APN-AMBR. The PGW 1025 may correlate the PGW Address for the user plane and PGW TEID of the user plane, with the Serving GW Address for the user plane and Serving GW TEID of the user plane received from SGW 1020. The correlated information may be used as the user plane tunnel address between the SGW 1020 and the PGW/LGW 1025.

In response to the message received from the PGW 1025, the SGW 1020 may correlate the Serving GW Address for the user plane and Serving GW TEID of the user plane, with the PGW/LGW Address for the user plane and PGW/LGW TEID of the user plane received from the PGW/LGW 1025. In response to the message received from the MME 1010, the SGW 1020 may response to the MME 1010 a Create Session Response message comprising at least one of: PDN Type, PDN Address, SGW address for User Plane, SGW TEID for User Plane, SGW TEID for control plane, EPS Bearer Id, EPS Bearer QoS, and/or APN-AMBR. The MME 1010 may send to UE 100 a PDN Connectivity Accept message comprising at least one of: APN, PDN Type, PDN Address, and/or EPS Bearer Id. If the PDN connection uses the user plane over the radio, this message may be contained in an S1_MME control message Bearer Setup Request (APN, PDN Type, PDN Address, SGW address for User Plane, SGW TEID for User Plane, SGW TEID for control plane, EPS Bearer QoS, UE-AMBR, PDN Connectivity Accept) to the eNodeB 1005.

In response to the message received from the MME 1010, the eNodeB 1005 may take one or more actions. In an example action, the eNodeB 1005 may store the information received from the MME 1010. The eNodeB 1005 may use the SGW address for User Plane, SGW TEID for User Plane for the uplink data forwarding. In an example action, the eNodeB 1005 may send RRC Connection Reconfiguration to the UE 100 including the PDN Connectivity Accept message. In response to the message received from the eNodeB 1005, the UE 400 may response to the eNodeB 1005 an RRC Connection Reconfiguration Complete message. In response to the message received from the UE 100, the eNodeB 1005 may send to the MME 1010 an S1-AP Bearer Setup Response message. The S1-AP message may comprise the TEID of the eNodeB and the address of the eNodeB used for downlink traffic on the S1_U reference point. The eNodeB 1005 may correlate the TEID of the eNodeB and the address of the eNodeB, with the SGW address for User Plane and the SGW TEID for User Plane received from the MME 1010. The correlated information may be used as the user plane tunnel address between the eNodeB 1005 and the SGW 1020.

The UE NAS layer may build a PDN Connectivity Complete message comprising EPS Bearer Identity, and the UE 100 may send to the eNodeB 1005 a Direct Transfer message comprising the PDN Connectivity Complete message. In response to the message received from the UE 100, the eNodeB 1005 may send to the MME 1010 an Uplink NAS Transport message comprising PDN Connectivity Complete message. In response to the message received from the eNodeB 1005, the MME 1010 may send to SGW 1020 a Modify Bearer Request message comprising at least one of: EPS Bearer Identity, eNodeB address, eNodeB TEID, Handover Indication, and/or Presence Reporting Area Information. The SGW 1020 may correlate the TEID of the eNodeB and the address of the eNodeB, with the SGW address for User Plane and the SGW TEID for User Plane. In response to the message received from the MME 1010, the SGW 1020 may send to the MME 1010 a Modify Bearer Response comprising the EPS Bearer Identity. The SGW 1020 may then send its buffered downlink packets to the eNodeB 1005.

Example 5

Figure 16:
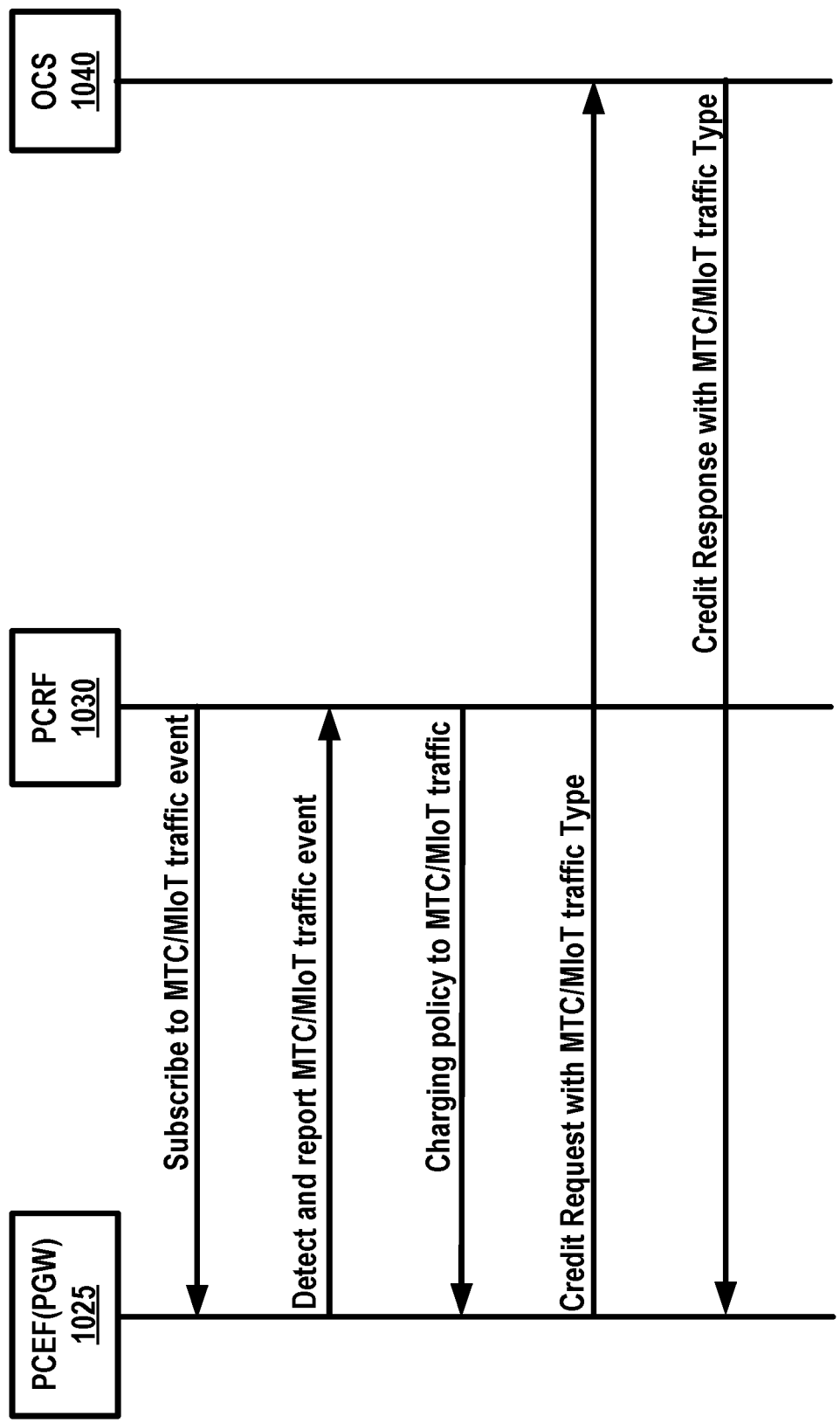
FIG. 16 is an example call flow diagrams as per an aspect of an embodiment of the present disclosure.

In an example, a PCEF(PGW) may report an MTC/MIoT traffic event to a PCRF, the PCRF may make the charging policy based on such event and send the charging policy to the PCEF(PGW) for enforcement. FIG. 16 shows an example call flow which may comprise one or more actions.

A PCRF 1030 may send to a PCEF(PGW) 1025 a message (e.g. Acknowledge IP-CAN session Establishment/Modification, or Policy and Charging Rules Provision) to subscribe an MTC/MIoT traffic event, and the message may comprise the subscribed event trigger(s) (e.g. MTC/MIoT traffic event). As an example, the MTC/MIoT traffic event may be configured in the PCEF(PGW) 1025 without the subscription from the PCRF 1030. When detect the MTC/MIoT traffic event, the PCEF(PGW) 1025 may send to the PCRF 1030 a message (e.g. IP-CAN session Modification) to report the detected event, and the message may comprise the MTC/MIoT traffic event. In response to the message received from the PCEF(PGW) 1025, the PCRF 1030 may take one or more actions. In an example action, the PCRF 1030 may make the charging policy decision based on the information received from the PCEF(PGW) 1025 (e.g. the MTC/MIoT traffic event) and/or other information (e.g. subscription information); and as an example, the PCRF 1030 may make the following charging policy decision: determining a flat rate for the MTC/MIoT traffic. In an example action, the PCRF 1030 may send to the PCEF (PGW) 1025 a message (e.g. Acknowledge IP-CAN session Establishment/Modification, or Policy and Charging Rules Provision) by providing the charging policy (s) applied to the MTC/MIoT traffic related service data flow (s) and/or IP-CAN session (s). Based on the charging policy received from the PCRF 1030 and/or local configuration, the PCEF (PGW) 1025 may send to an OCS 1140 a message (e.g. Credit Request) comprising one or more of the following information: the MTC/MIoT traffic; the IP-CAN session ID; and the identity of wireless device (e.g. IMSI).

In response to the message received from the PCEF (PGW) 1025, the OCS 1140 may take one or more actions. In an example action, the OCS 1140 may make charging credit decision based on the information received from the PGW 1025 (e.g. service type/application type (e.g. 8K UHD video)) and/or other information (e.g. subscription information); as an example, the OCS 1140 may take one or more charging credit decisions. In an example decision, the OCS 1140 may allocate a small number of units (e.g. data volume, time) for the MTC/MIoT traffic. In an example decision, the OCS 1140 may determine a flat charging rate for the MTC/MIoT traffic. In an example action, the OCS 1140 may send to the PGW 1025 a response message (e.g. Credit Response) by providing the granted charging credit units and/or policy (s) applied to: the service type/application type (e.g. URLLC) related service data flow(s); and/or the IP-CAN session; and/or the wireless device. The PCEF(PGW) 1025 may perform the charging function based on the charging credit units received from the OCS 1140 and/or policy (s) received from the PCRF 1030.

Example 6

Figure 17:
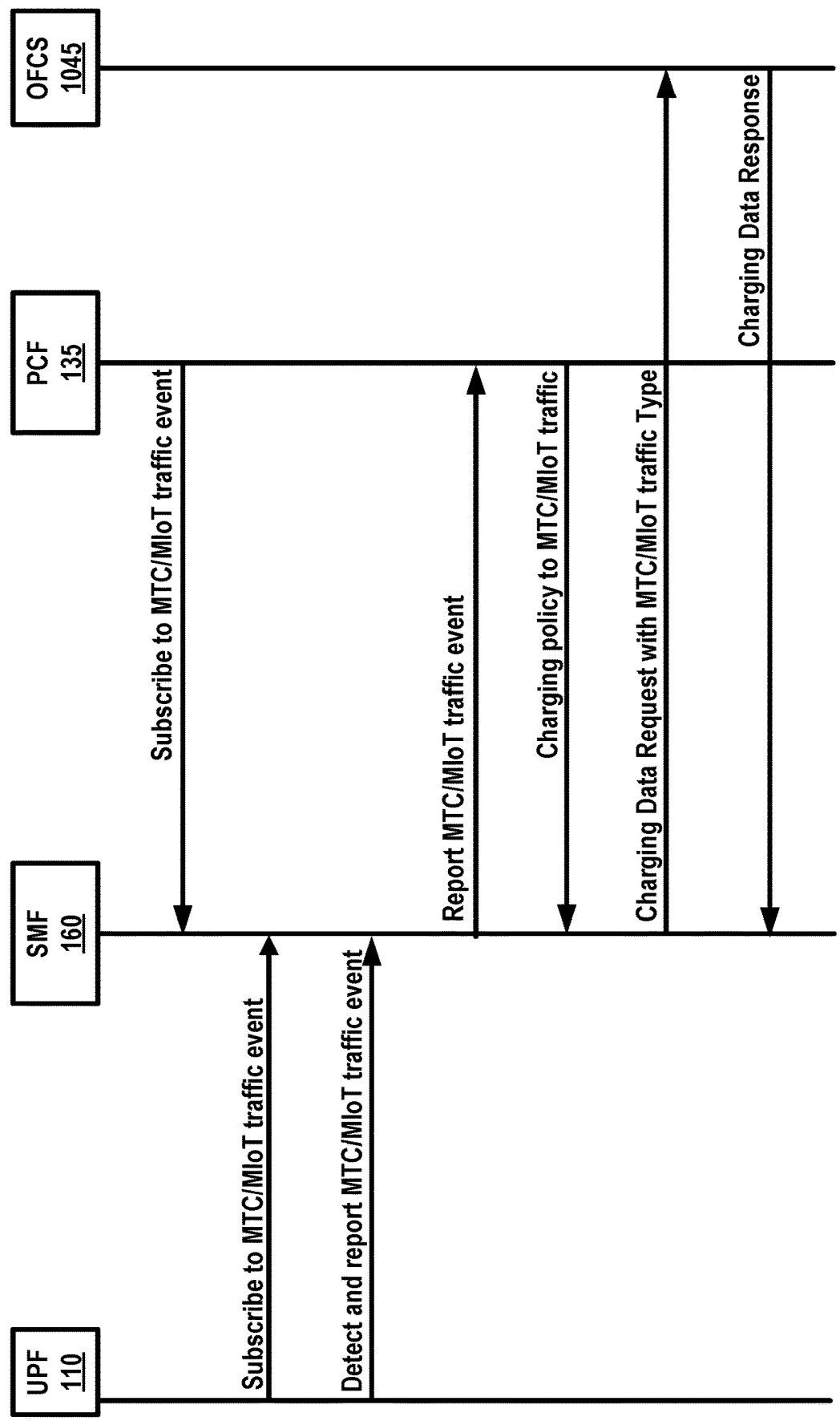
FIG. 17 is an example call flow diagrams as per an aspect of an embodiment of the present disclosure.

In an example, an SMF may report an MTC/MIoT traffic event to a PCF, the PCF may make the charging policy based on such event and send the charging policy to the SMF for enforcement. FIG. 17 shows an example call flow which may comprise one or more actions.

A PCF 135 may send to an SMF 160 a message (e.g. Namf_EventExposure_Subscribe) to subscribe an MTC/MIoT traffic event, the message may comprise the subscribed event trigger (s) (e.g. the MTC/MIoT traffic event). As an example, the MTC/MIoT traffic event may be configured in the SMF 160 without the subscription from the PCF 135. In response to the message received from the PCF 135, the SMF 160 may send to an UPF 110 a message to subscribe the MTC/MIoT traffic event, and the message may comprise the subscribed event trigger (s) (e.g. the MTC/MIoT traffic event). When detect the MTC/MIoT traffic event, the UPF 110 may send to the SMF 160 a message (e.g. event report message) comprising the MTC/MIoT traffic event. In response to the message received from the UPF 110, the SMF 160 may send to the PCF 135 a message (e.g. Nsmf_EventExposure_Notify) comprising the MTC/MIoT traffic event to report the detected MTC/MIoT traffic event.

In response to the message received from the SMF 160, the PCF 135 may take one or more actions. In an example action, the PCF 135 may make the charging policy decision based on the information received from the SMF 160 (e.g. the MTC/MIoT traffic event) and/or other information (e.g. subscription information); and as an example, the PCF 135 may make the following charging policy decision: determining a flat rate for the MTC/MIoT traffic. In an example action, the PCF 135 may send to the SMF 160 a message (e.g. Npcf_SMPolicyControl_UpdateNotify) by providing the charging policy (s) applied to the MTC/MIoT traffic related service data flow (s) and/or PDU Session (s). Based on the charging policy received from the PCF 135 and/or local configuration, the SMF 160 may send to an OFCS 1145 a message (e.g. Charging Data Request) comprising one or more of the following information: the MTC/MIoT traffic event; the PDU session ID; and the identity of wireless device (e.g. IMSI).

In response to the message received from the SMF 160, the OFCS 1145 may take one or more actions. In an example action, the OFCS 1145 may perform the charging based on the information received from the SMF 160 (e.g. MTC/MIoT traffic event) and/or other information (e.g. subscription information); as an example, the OFCS 1145 may perform the following charging: determining a flat rate for the MTC/MIoT traffic event. In an example action, the OFCS 1145 may send to the SMF 160 a response message (e.g. Charging Data Response). The SMF 160 and UPF 110 may perform the charging function based on the charging policy (s) received from the PCF 135.

In an example, the PGW may receive a first message from the SGW to establish a PDN session, and the first message may comprise at least one of: a device type indicating the type of the wireless device; and the device type comprising one of the following information: Internet of Things (IoT) device; Vehicle device; and/or cell phone; a service type/application type to indicate the service applied to the PDN session, and the service type/application type comprising one of: machine type communications (MTC); Internet of Things (IoT); ultra-reliable low-latency communications (URLLC); Vehicle-to-X communications (V2X); and an application type for packed data service; a user identity of a wireless device; and an APN for the PDN session. The PGW may send to the PCRF a second message to request a charging policy comprising the device type and/or the service type/application type. The PCRF may determine the charging policy based on the device type and/or the service type/application type. The PGW may receive from the PCRF a response message comprising the charging policy, and the PGW may enforce the charging policy on at least one radio bearer and/or session.

Example 7

In an example, a UE may send a first message to a network node (e.g. AMF). The first message may comprise service type/application type, and/or device type. The PCF may determine the policy(s) (e.g. QoS policy, gating policy, and/or traffic steering control policy) based on the service type/application type, and/or device type. The SMF may enforce the policy(s). FIG. 12 shows an example call flow which may comprise one or more actions.

A UE may send to AMF 155 a NAS Message comprising at least one of S-NSSAI, DNN, PDU Session ID, Request type, and/or N1 SM container (PDU Session Establishment Request). The UE 100 may initiate a UE requested PDU session establishment procedure by the transmission of a NAS message containing a PDU session establishment request within the N1 SM container. The PDU session establishment request may comprise a PDU Type (e.g. Ethernet), SSC mode, Protocol Configuration Options, and/or a PDU session ID generated by the UE. NAS Message and/or N1 SM container may comprise one or more information elements. In an example, the NAS Message and/or N1 SM container may comprise a service type/application type. The service type/application type may be used to indicate the service applied to the PDU session, and the service type/application type may comprise one of the following service/application: machine type communications (MTC); ultra-reliable low-latency communications (URLLC); Vehicle-to-X communications (V2X); Internet of Things (IoT); and an application type for packed data service (e.g. 8K UHD 8K UHD video). In an example, the NAS Message and/or N1 SM container may comprise a device type. The device type may be used to indicating the type of the wireless device; and the device type may comprise one of the following devices: Internet of Things (IoT) device; Vehicle device; Cell phone; Wearable device; Sensor for industry automation; and Other devices. As an example, the value of Wearable device and Sensor for industry automation may be used as specific type of IoT device. In an example, the NAS Message and/or N1 SM container may comprise a user identity of a wireless device. In an example, the NAS Message and/or N1 SM container may comprise an APN for the PDN session. FIG. 19 may be an example of the definition of the service type/application type, and FIG. 20 may be an example of the definition of the device type. As an example, the NAS Message and/or N1 SM container may comprise a URLLC service type and/or an IoT device type.

In response to the message received from the UE 100, the AMF 155 may take one or more actions. In an example action, the AMF 155 may select an SMF based on the service type/application type and/or the device type, as an example, the AMF 155 may select an SMF 160 close to the user to meet the requirement of URLLC service. In an example action, the AMF 155 may send to the SMF 160 a message (e.g. PDUSession_CreateSMContext Request) comprising at least one of: SUPI, DNN, S-NSSAI, PDU Session ID, AMF ID, Request Type, N1 SM container (PDU Session Establishment Request), User location information, Access Type, PEI). The message sent to SMF 160 may comprise the service type/application type (e.g. URLLC) and/or the device type (IoT) received from the UE 100. In response to the message received from the AMF 155, the SMF 160 may send to a PCF (e.g. PCF 135) a message (e.g. SMPolicyControl_Get) to establish a PDU session with the PCF 135 and get the default PCC Rules for the PDU session. The message sent to PCF 135 may comprise the service type/application type (e.g. URLLC) and/or the device type (IoT) received from the AMF 155.

In response to the message received from the SMF 160, the PCF 135 may take one or more actions. In an example action, the PCF 135 may make the policy decision based on the information received from the SMF 160 (e.g. service type/application type (e.g. URLLC) and/or the device type (IoT)) and/or other information (e.g. subscription information); as an example, the PCF 135 may make one or more policy decisions. The PCF 135 may make a QoS policy decision. The QoS policy may be used to control the quality of service of a service data flow, bearer, PDU session, application and/or a wireless device; as an example, the QoS policy may comprise the Guaranteed Bit Rate (GBR), Aggregate Maximum Bit Rate (AMBR), QoS-Class-Identifier (QCI) and/or Allocation and Retention Priority (ARP) parameters. The PCF 135 may make a gating policy decision. The gating policy may be used to enable or disable a service data flow and/or an application. The PCF 135 may make a traffic steering control policy decision. The traffic steering control policy may be used to steer the traffic to appropriate operator or 3rd party service functions (e.g. NAT, antimalware, parental control, DDoS protection) in the (S)Gi-LAN. As an example, the traffic steering control policy may comprise the traffic steering policy identifier and/or the application identifier. The above policy(s) may be applied to the service type/application type (e.g. URLLC) and/or the device type (IoT) related service data flow(s), and/or PDU session, and/or wireless device. In an example action, the PCF 135 may send to the SMF 160 a message (e.g. SMPolicyControl_Response) by providing the policy (s) (e.g. QoS policy, gating policy and/or traffic steering control policy) applied to the service type/application type (e.g. URLLC) and/or the device type (IoT) related service data flow(s) and/or PDU session, and/or wireless device.

In response to the message received from the PCF 135, the SMF 160 may take one or more actions. In an example action, the SMF 160 may select an UPF based on the service type/application type and/or the device type, as an example, the SMF 160 may select an UPF 110 close to the user to meet the requirement of URLLC service. In an example action, the SMF 160 may send to the UPF 110 a message (e.g. N4 session establishment/modification Request) to establish/modify the user plane session. The message may comprise the policy (s) (e.g. QoS policy, gating policy and/or traffic steering control policy) applied to the service type/application type (e.g. URLLC) and/or the device type (IoT) related service data flow(s) and/or PDU session, and/or wireless device. If CN Tunnel Info is allocated by the SMF 160, the SMF 160 may send the CN Tunnel Info to UPF 110 in this step. The CN Tunnel Info may comprise address(es) of UPF 110 and/or tunnel ID for N3 tunnel corresponding to the PDU Session, where the N3 tunnel may be between the (R)AN 105 and the UPF 110. The UPF 110 may acknowledge SMF 160 by sending an N4 session establishment/modification response. If CN Tunnel Info is allocated by the UPF 110, the UPF 110 may send the CN Tunnel Info to SMF 160 in this step. The SMF 160 and/or UPF 110 may enforce the received policy (s) (e.g. QoS policy, gating policy and/or traffic steering control policy) applied to the service type/application type (e.g. URLLC) and/or the device type (IoT) related service data flow(s) and/or PDU session, and/or wireless device.

In response to the message received from the AMF 155, the SMF 160 may send to the AMF 155 a PDUSession_CreateSMContext Response message comprising at least one of: Cause, N2 SM information (PDU Session ID, QoS Profile(s), CN Tunnel Info, S-NSSAI, Session-AMBR), and/or N1 SM container (PDU session establishment accept (QoS Rule, SSC mode, S-NSSAI, allocated IPv4 address, Session-AMBR)). In response to the message received from the SMF 160, the AMF 155 may send to (R)AN 105 an N2 PDU session request message comprising N2 SM information, and/or NAS message, and the NAS message may comprise at least one of: PDU Session ID, and/or N1 SM container (PDU session establishment accept). In response to the message received from the AMF 155, the (R)AN 105 may send to UE 100: AN specific signaling that is related with the information received from SMF 160. (R)AN 105 may allocate (R)AN N3 tunnel information for the PDU Session.

(R)AN 105 may forward to the UE 100 the NAS message (PDU Session ID, N1 SM container (PDU Session Establishment Accept)). (R)AN 105 may send the NAS message to the UE 100 if the RAN resources have been established and the allocation of (R)AN tunnel information have been successful. The (R)AN 105 may send to the AMF 155 an N2 PDU session response message comprising at least one of: PDU Session ID, Cause, and/or N2 SM information (PDU Session ID, (R)AN Tunnel Info, list of accepted/rejected QoS profile(s)). The (R)AN Tunnel Info corresponds to the Access Network address of the N3 tunnel corresponding to the PDU Session.

In response to the message received from the (R)AN 105, the AMF 155 may send to SMF 160 a UpdateSMContext Request (N2 SM information). The AMF 155 may forward the N2 SM information received from (R)AN 105 to the SMF 160. In response to the message received from the AMF 155, the SMF 160 may send to the UPF 110 a message (e.g. N4 session establishment/modification request) comprising one or more of the following information: Policy(s) (e.g. QoS policy, gating policy and/or traffic steering control policy) applied to the service type/application type (e.g. URLLC) and/or the device type (IoT) related service data flow(s) and/or PDU session, and/or wireless device; and AN Tunnel Info and CN Tunnel Info. In response to the message received from the SMF 160, the UPF 110 may send an N4 session establishment/modification response to the SMF 160. The UPF may enforce the policy(s) received from the SMF 160. In response to the message received from the AMF 155, the SMF 160 may send to the AMF 155 a UpdateSMContext Response (Cause) message.

Example 8

In an example, a UE may initiate a service request procedure, a service request message may comprise a V2X service type/application type and/or a Vehicle device type. FIG. 13 shows an example call flow which may comprise one or more actions.

A UE 100 may send to a (R)AN 105 an AN message comprising at least one of: AN parameters, and/or MM NAS Service Request (PDU Session(s) to be activated, security parameters, PDU Session status). In case of NG-RAN, the AN parameters may comprise Establishment cause. The Establishment cause provides the reason for requesting the establishment of an RRC connection. In case of NG-RAN, the UE 100 may send NAS Service Request message towards the AMF 155 encapsulated in an RRC message to the RAN, and the RRC message(s) that may be used to carry the 5G-GUTI and this NAS message. The message sent to (R)AN 105 may comprise a service type/application type (e.g. V2X) and/or a device type (e.g. Vehicle). In response to the message received from the UE 100, the (R)AN 105 may send to an AMF 155 an N2 Message comprising at least one of: N2 parameters, MM NAS Service Request, the service type/application type (e.g. V2X) and/or the device type (e.g. Vehicle). When NG-RAN is used, the N2 parameters may comprise the 5G-GUTI, Location information, RAT type and Establishment cause. Based on the PDU Session status, the AMF 155 may initiate PDU Session release procedure for the PDU Sessions whose PDU Session ID(s) were indicated by the UE as not available.

In response to the message received from the (R)AN 105, the AMF 155 may send to an SMF 160 a PDUSession_UpdateSMContext Request message comprising at least one of: PDU Session ID(s), Cause(s), UE location information, Access Type, service type/application type (e.g. V2X) and/or the device type (e.g. Vehicle). The PDUSession_UpdateSMContext Request may be invoked if the UE 100 identifies PDU Session(s) to be activated in the MM NAS Service Request message. In response to the message received from the AMF 155, the SMF 160 may send to a PCRF 135 an SMPolicyControl_Get message to get the policy (s) (e.g. QoS policy, gating policy, and/or traffic steering control policy) for the service type/application type (e.g. V2X) and/or the device type (e.g. Vehicle), and/or the PDU Session (s). The message sent to PCF 135 may comprise the service type/application type (e.g. V2X) and/or the device type (e.g. Vehicle).

In response to the message received from the SMF 160, the PCF 135 may take one or more actions. In an example action, the PCF 135 may make the policy decision based on the information received from the SMF 160 (e.g. service type/application type (e.g. V2X) and/or the device type (e.g. Vehicle) information) and/or other information (e.g. subscription information); and as an example, the PCF 135 may determine one or more of the following policies: QoS policy; Gating policy; and Traffic steering control policy. The above policy(s) may be applied to the service type/application type (e.g. V2X) and/or the device type (Vehicle) related service data flow(s), and/or PDU session(s), and/or wireless device. In an example action, the PCF 135 may send to the SMF 160 a message (e.g. SMPolicyControl_Response) by providing the policy (s) (e.g. QoS policy, gating policy and/or traffic steering control policy) applied to the service type/application type (e.g. V2X) and/or the device type (Vehicle) related service data flow(s) and/or PDU session(s), and/or wireless device.

In response to the message received from the PCF 135, the SMF 160 may take one or more actions. In an example action, the SMF 160 may select an UPF based on the service type/application type and/or the device type, as an example, the SMF 160 may select an UPF 110 close to the user to meet the requirement of V2X service. In an example action, the SMF 160 may send to the UPF 110 a message (e.g. N4 session establishment/modification Request) to establish/modify the user plane session. The message may comprise the policy (s) (e.g. QoS policy, gating policy and/or traffic steering control policy) applied to the service type/application type (e.g. V2X) and/or the device type (Vehicle) related service data flow(s) and/or PDU session, and/or wireless device. If CN Tunnel Info is allocated by the SMF 160, the SMF 160 may send the CN Tunnel Info to UPF 110 in this step. The CN Tunnel Info may comprise address(es) of UPF 110 and/or tunnel ID for N3 tunnel corresponding to the PDU Session, where the N3 tunnel may be between the (R)AN 105 and the UPF 110.

In response to the message received from the SMF 160, the UPF 110 may acknowledge SMF 160 by sending an N4 session establishment/modification response. If CN Tunnel Info is allocated by the UPF 110, the UPF 110 may send to the SMF 160 the CN Tunnel Info in this step. The SMF 160 and/or UPF 110 may enforce the received policy (s) (e.g. QoS policy, gating policy and/or traffic steering control policy) applied to the service type/application type (e.g. URLLC) and/or the device type (IoT) related service data flow(s) and/or PDU session, and/or wireless device. In response to the message received from the AMF 155, the SMF 160 may send to the AMF 155 a PDUSession_UpdateSMContext Response comprising N1 SM information (PDU Session ID (s), PDU Session re-establishment indication), and/or N2 SM information (PDU Session ID (s), QoS profile, CN N3 Tunnel Info, S-NSSAI), Cause).

In response to the message received from the SMF 160, the AMF 155 may send to (R)AN 105 an N2 PDU session request message comprising N2 SM information, and/or NAS message, and the NAS message may comprise at least one of: PDU Session ID, and/or N1 SM container (PDU session establishment accept). In response to the message received from the AMF 155, the (R)AN 105 may send to UE 100: AN specific signaling that is related with the information received from SMF 160. (R)AN 105 may allocate (R)AN N3 tunnel information for the PDU Session. (R)AN 105 may forward to the UE 100 the NAS message (PDU Session ID, N1 SM container (PDU Session Establishment Accept)). (R)AN 105 may send the NAS message to the UE 100 if the RAN resources have been established and the allocation of (R)AN tunnel information have been successful. The (R)AN 105 may send to the AMF 155 an N2 PDU session response message comprising at least one of: PDU Session ID, Cause, and/or N2 SM information (PDU Session ID, (R)AN Tunnel Info, list of accepted/rejected QoS profile(s)). The (R)AN Tunnel Info corresponds to the Access Network address of the N3 tunnel corresponding to the PDU Session.

In response to the message received from the (R)AN 105, the AMF 155 may send to SMF 160 a UpdateSMContext Request (N2 SM information). The AMF 155 may forward the N2 SM information received from (R)AN 105 to the SMF 160. In response to the message received from the AMF 155, the SMF 160 may send to the UPF 110 a message (e.g. N4 session establishment/modification request) comprising one or more of the following information: Policy(s) (e.g. QoS policy, gating policy and/or traffic steering control policy) applied to the service type/application type (e.g. URLLC) and/or the device type (IoT) related service data flow(s) and/or PDU session, and/or wireless device; and AN Tunnel Info and CN Tunnel Info. In response to the message received from the SMF 160, the UPF 110 may send an N4 session establishment/modification response to the SMF 160. The UPF may enforce the policy(s) received from the SMF 160. In response to the message received from the AMF 155, the SMF 160 may send to the AMF 155 a UpdateSMContext Response (Cause) message.

Example 9

In an example, a UE may initiate an attach procedure. The attach request message may comprise an IoT service type/application type. FIG. 14 shows an example call flow which may comprise one or more actions.

A UE may initiate attach procedure by sending to an eNodeB 1005 an attach request message comprising at least one of: IMSI or old GUTI, Old GUTI type, last visited TAI (if available), UE Core Network Capability, Attach Type, ESM message container, additional GUTI, P-TMSI signature, and/or MS Network Capability. The message may be together with RRC parameters indicating the Selected Network and the old GUMMEI. The attach request message may comprise a service type/application type (e.g. IoT). In response to the message received from the UE 100, the eNodeB 1005 may forward to an MME 1010 the received attach request message comprising the service type/application type (e.g. IoT). In response to the message received from the eNodeB 1005, the MME 1010 may allocate a Bearer Id, select a gateway (e.g. SGW 1020), and send to the SGW 1020 a message (e.g. a create session request) comprising at least one of: service type/application type, IMSI, MME TEID for control plane, RAT type, PGW address, PDN Address, Default EPS Bearer QoS, PDN Type, subscribed APN-AMBR, APN, EPS Bearer Id, and/or Protocol Configuration Options. In response to the message received from the MME 1010, the SGW 1020 may create a new entry in its EPS Bearer table and store the information received from the MME 1010 (e.g. service type/application type), and may send to a PGW 1025 a message (e.g. a create session request) comprising at least one of: service type/application type, IMSI, Serving GW Address for the user plane, Serving GW TEID of the user plane, Serving GW TEID of the control plane, RAT type, Default EPS Bearer QoS, PDN Type, PDN Address, subscribed APN-AMBR, APN and/or Bearer Id, wherein the address of the PGW/LGW 1025 (e.g. PGW address) has been received from the MME 1010.

In response to the message received from the SGW 1020, the PGW 1025 may create a new entry in its EPS bearer context table, store the information received from the SGW 1020 (e.g. service type/application type), and generates a Charging Id for the Default Bearer. The new entry allows the PGW to route user plane PDUs between the S-GW and the packet data network (e.g. forward the traffic to a local network closed to the user based on the service type/application type information in the EPS bearer table or context when receiving an uplink data packet.). The PGW 1025 may send to a PCRF 1030 a message (e.g. IP-CAN session establishment request) to get the policy (s) (e.g. QoS policy, gating policy, and/or traffic steering control policy) for the service type/application (e.g. IoT), and/or IP-CAN session, and/or wireless device. The message sent to the PCRF 1030 may comprise the service type/application type (e.g. IoT) information received from the SGW 1020.

In response to the message received from the PGW 1025, the PCRF 1030 may take one or more actions. In an example action, the PCRF 1030 may make the policy decision based on the information received from the PGW 1025 (e.g. service type/application type (e.g. IoT) information) and/or other information (e.g. subscription information); and as an example, the PCF 135 may determine one or more of the following policies: QoS policy; Gating policy; and Traffic steering control policy. The above policy(s) may be applied to the service type/application type (e.g. IoT) related service data flow(s), and/or IP-CAN session, and/or wireless device. In an example action, the PCRF 1030 may send to the PGW 1025 a message (e.g. IP-CAN session establishment response) by providing the policy (s) (e.g. QoS policy, gating policy and/or traffic steering control policy) applied to the service type/application type (e.g. IoT) related service data flow(s), and/or IP-CAN session, and/or wireless device. The PGW 1025 may enforce the received policy (s) (e.g. QoS policy, gating policy and/or traffic steering control policy) applied to the service type/application type (e.g. IoT) related service data flow(s) and/or IP-CAN session, and/or wireless device. In response to the message received from the SGW 1020, the PGW 1025 may return to the SGW 1020 a message (e.g. create session response) comprising at least one of: PGW Address for the user plane, PGW TEID of the user plane, PGW TEID of the control plane, PDN Type, PDN Address, EPS Bearer Id, EPS Bearer QoS, Charging Id, and/or APN-AMBR. The PGW 1025 may correlate the PGW Address for the user plane and PGW TEID of the user plane, with the Serving GW Address for the user plane and Serving GW TEID of the user plane received from SGW 1020. The correlated information may be used as the user plane tunnel address between the SGW 1020 and the PGW 1025.

In response to the message received from the PGW 1025, the SGW 1020 may correlate the Serving GW Address for the user plane and Serving GW TEID of the user plane, with the PGW Address for the user plane and PGW TEID of the user plane received from the PGW 1025. In response to the message received from the MME 1010, the SGW 1020 may response to the MME 1010 a message (e.g. create session response) comprising at least one of: PDN Type, PDN Address, SGW address for User Plane, SGW TEID for User Plane, SGW TEID for control plane, EPS Bearer Id, EPS Bearer QoS, PGW/LGW address and TEID (GTP-based S5/S8) at the PGW for uplink traffic and/or APN-AMBR. The MME 1010 may send to the eNodeB 1005 an Attach Accept message comprising at least one of: GUTI, TAI List, and/or Session Management Request (APN, PDN Type, PDN Address, EPS Bearer Identity, Protocol Configuration Options, Header Compression Configuration), and the message may be contained in an S1_MME control message Initial Context Setup Request. The S1-AP Initial Context Setup Request message may also comprise the EPS Bearer QoS, the UE-AMBR, EPS Bearer Identity, as well as the TEID at the Serving GW used for user plane and the address of the Serving GW for user plane.

In response to the message received from the MME 1010, the eNodeB 1005 may take one or more actions. In an example action, the eNodeB 1005 may store the information received from the MME 1010. The eNodeB 1005 may use the SGW address for User Plane, SGW TEID for User Plane for the uplink data forwarding. In an example action, the eNodeB 1005 may send to the UE 100 an RRC Connection Reconfiguration comprising EPS Radio Bearer Identity. In response to the message received from the eNodeB 1005, the UE 100 may response to the eNodeB 1005 an RRC Connection Reconfiguration Complete message. In response to the message received from the UE 100, the eNodeB 1005 may send to the MME 1010 an initial context setup response message. The message may comprise the TEID of the eNodeB and the address of the eNodeB used for downlink traffic on the 51 U reference point.

The eNodeB 1005 may correlate the TEID of the eNodeB and the address of the eNodeB, with the SGW address for User Plane and the SGW TEID for User Plane received from the MME 1010. The correlated information may be used as the user plane tunnel address between the eNodeB 1005 and the SGW 1020. The UE 100 may send a direct transfer message to the eNodeB 1005, which may comprise an attach complete message comprising at least one of: EPS Bearer Identity, NAS sequence number, and/or NAS-MAC. In response to the message received from the UE 100, the eNodeB 1005 may forwards the attach complete message to the MME 1010 in an Uplink NAS Transport message. In response to the message received from the eNodeB 1005, the MME 1010 may send to SGW 1020 a message (e.g. modify bearer request) comprising at least one of: EPS Bearer Identity, eNodeB address, eNodeB TEID, Handover Indication, and/or Presence Reporting Area Information. The SGW 1020 may correlate the TEID of the eNodeB and the address of the eNodeB, with the SGW address for User Plane and the SGW TEID for User Plane. In response to the message received from the MME 1010, the SGW 1020 may send to the MME 1010 a message (e.g. modify bearer response) comprising the EPS Bearer Identity. The SGW 1020 may then send its buffered downlink packets to the eNodeB 1005.

Example 10

In an example, a UE may initiate PDN connectivity request. The PDN connectivity request message may comprise an 8K UHD video service type/application type. FIG. 15 shows an example call flow which may comprise one or more actions.

UE 100 may send to an MME 1010 a PDN connectivity request message comprising at least one of: APN, PDN Type, Protocol Configuration Options, Request Type, and/or Header Compression Configuration to establish a PDN session. The PDN connectivity request may comprise the service type/application type (e.g. 8K UHD video) indicating the requested service/application applied to the PDN session. As an example, the PDN connectivity request may comprise the information elements as listed in FIG. 18. FIG. 19 shows an example definition of the service type/application type.

In response to the message received from the UE 100, the MME 1010 may perform one or more of the following actions: In an example action, the MME 1010 may select an SGW and/or a PGW based on the service type/application type (e.g. 8K UHD video), as an example, the MME 1010 may select an SGW and/or a PGW close to the user to meet the requirement of 8K UHD video service. In an example action, the MME 1010 may allocate a Bearer Id. In an example action, the MME 1010 may send to the selected gateway (e.g. SGW 1020) a message (e.g. a create session request) comprising at least one of: service type/application type (e.g. 8K UHD video), IMSI, MME TEID for control plane, RAT type, PGW address, PDN Address, Default EPS Bearer QoS, PDN Type, subscribed APN-AMBR, APN, EPS Bearer Id, and/or Protocol Configuration Options. In response to the message received from the MME 1010, the SGW 1020 may create a new entry in its EPS Bearer table and store the information received from the MME 1010 (e.g. service type/application type), and may send to a PGW 1025 a message (e.g. create session request) comprising at least one of: IMSI, Serving GW Address for the user plane, Serving GW TEID of the user plane, Serving GW TEID of the control plane, RAT type, Default EPS Bearer QoS, PDN Type, PDN Address, subscribed APN-AMBR, APN, and/or Bearer Id, wherein the address of the PGW 1025 (e.g. PGW address) has been received from the MME 1010.

In response to the message received from the SGW 1020, the PGW 1025 may create a new entry in its EPS bearer context table, store the information received from the SGW 1020 (e.g. service type/application type), and generates a Charging Id for the Default Bearer. The new entry allows the PGW to route user plane PDUs between the S-GW and the packet data network (e.g. forward the traffic to a local network closed to the user based on the service type/application type information in the EPS bearer table or context when receiving an uplink data packet.). The PGW 1025 may send to a PCRF 1030 a message (e.g. IP-CAN session establishment/modification request) to get the policy (s) (e.g. QoS policy, gating policy, and/or traffic steering control policy) for the service type/application (e.g. 8K UHD video), and/or IP-CAN session, and/or wireless device. The message sent to the PCRF 1030 may comprise the service type/application type (e.g. 8K UHD video) information received from the SGW 1020.

In response to the message received from the PGW 1025, the PCRF 1030 may take one or more of the following actions: In an example action, the PCRF 1030 may make the policy decision based on the information received from the PGW 1025 (e.g. service type/application type (e.g. 8K UHD video) information) and/or other information (e.g. subscription information); and as an example, the PCF 135 may make one or more of the following policy decisions: QoS policy; Gating policy; and Traffic steering control policy. The above policy(s) may be applied to the service type/application type (e.g. 8K UHD video) related service data flow(s), and/or IP-CAN session, and/or wireless device. In an example action, the PCRF 1030 may send to the PGW 1025 a message (e.g. IP-CAN session establishment/modification response) by providing the policy (s) (e.g. QoS policy, gating policy and/or traffic steering control policy) applied to the service type/application type (e.g. 8K UHD video) related service data flow(s), and/or IP-CAN session, and/or wireless device. The PGW 1025 may enforce the received policy (s) (e.g. QoS policy, gating policy and/or traffic steering control policy) applied to the service type/application type (e.g. 8K UHD video) related service data flow(s) and/or IP-CAN session, and/or wireless device.

In response to the message received from the SGW 1020, the PGW 1025 may return to the SGW 1020 a message (e.g. create session response) comprising at least one of: PGW Address for the user plane, PGW TEID of the user plane, PGW TEID of the control plane, PDN Type, PDN Address, EPS Bearer Id, EPS Bearer QoS, Charging Id, and/or APN-AMBR. The PGW 1025 may correlate the PGW Address for the user plane and PGW TEID of the user plane, with the Serving GW Address for the user plane and Serving GW TEID of the user plane received from SGW 1020. The correlated information may be used as the user plane tunnel address between the SGW 1020 and the PGW/LGW 1025. In response to the message received from the PGW 1025, the SGW 1020 may correlate the Serving GW Address for the user plane and Serving GW TEID of the user plane, with the PGW/LGW Address for the user plane and PGW/LGW TEID of the user plane received from the PGW/LGW 1025. In response to the message received from the MME 1010, the SGW 1020 may response to the MME 1010 a message (e.g. create session response) comprising at least one of: PDN Type, PDN Address, SGW address for User Plane, SGW TEID for User Plane, SGW TEID for control plane, EPS Bearer Id, EPS Bearer QoS, and/or APN-AMBR.

The MME 1010 may send to UE 100 a message (e.g. PDN Connectivity Accept) comprising at least one of: APN, PDN Type, PDN Address, and/or EPS Bearer Id. If the PDN connection uses the user plane over the radio, this message may be contained in an S1_MME control message Bearer Setup Request (APN, PDN Type, PDN Address, SGW address for User Plane, SGW TEID for User Plane, SGW TEID for control plane, EPS Bearer QoS, UE-AMBR, PDN Connectivity Accept) to the eNodeB 1005. In response to the message received from the MME 1010, the eNodeB 1005 may take one or more actions. In an example action, the eNodeB 1005 may store the information received from the MME 1010. The eNodeB 1005 may use the SGW address for User Plane, SGW TEID for User Plane for the uplink data forwarding. In an example action, the eNodeB 1005 may send RRC Connection Reconfiguration to the UE 100 including the PDN Connectivity Accept message. In response to the message received from the eNodeB 1005, the UE 400 may response to the eNodeB 1005 an RRC Connection Reconfiguration Complete message. In response to the message received from the UE 100, the eNodeB 1005 may send to the MME 1010 an S1-AP Bearer Setup Response message. The S1-AP message may comprise the TEID of the eNodeB and the address of the eNodeB used for downlink traffic on the S1_U reference point. The eNodeB 1005 may correlate the TEID of the eNodeB and the address of the eNodeB, with the SGW address for User Plane and the SGW TEID for User Plane received from the MME 1010. The correlated information may be used as the user plane tunnel address between the eNodeB 1005 and the SGW 1020. The UE NAS layer may build a PDN Connectivity Complete message comprising EPS Bearer Identity, and the UE 100 may send to the eNodeB 1005 a Direct Transfer message comprising the PDN Connectivity Complete message.

In response to the message received from the UE 100, the eNodeB 1005 may send to the MME 1010 an Uplink NAS Transport message comprising PDN Connectivity Complete message. In response to the message received from the eNodeB 1005, the MME 1010 may send to SGW 1020 a Modify Bearer Request message comprising at least one of: EPS Bearer Identity, eNodeB address, eNodeB TEID, Handover Indication, and/or Presence Reporting Area Information. The SGW 1020 may correlate the TEID of the eNodeB and the address of the eNodeB, with the SGW address for User Plane and the SGW TEID for User Plane. In response to the message received from the MME 1010, the SGW 1020 may send to the MME 1010 a Modify Bearer Response comprising the EPS Bearer Identity. The SGW 1020 may then send its buffered downlink packets to the eNodeB 1005.

In an example, the PGW may receive a first message from the SGW to establish a PDN session. The first message may comprise at least one of: a service type/application type, a device type, a user identity of a wireless device; and/or an APN for the PDN session. The service type/application type may indicate the service applied to the PDN session. The service type/application type may comprise one of: machine type communications (MTC); ultra-reliable low-latency communications (URLLC); Vehicle-to-X communications (V2X); Internet of Things (IoT); and/or an application type for packed data service. A device type may indicate the type of the wireless device. The device type may comprise one of the following information: Internet of Things (IoT) device; Vehicle device; cell phone; Wearable device; Sensor for industry automation and other devices.

The PGW may send to the PCRF a second message to request policy(s). The second message may comprise the device type and/or the service type/application type. The PCRF may determine the QoS policy, gating policy and/or traffic steering control policy based on the device type and/or the service type/application type. The PGW may receive from the PCRF a response message comprising the policy(s). The PGW may enforce the policy(s) on at least one radio bearer and/or session.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

Figure 21:
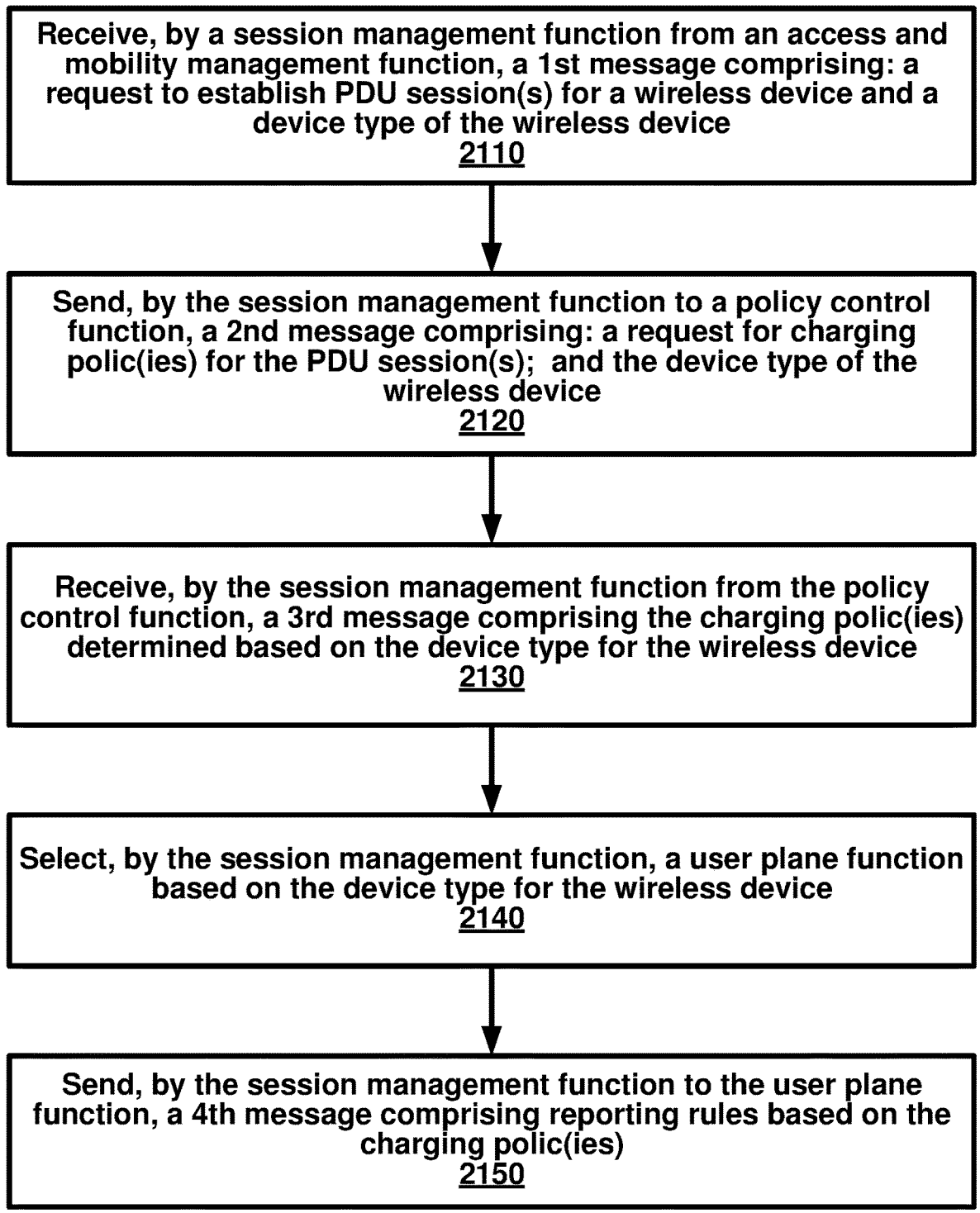
FIG. 21 is a flow diagram of an aspect of an embodiment of the present disclosure.

FIG. 21 is a flow diagram of an aspect of an embodiment of the present disclosure. At 2110, a session management function may receive a first message from an access and mobility management function. The first message may comprise a request to establish at least one packet data unit (PDU) session for a wireless device. The first message may comprise a device type of the wireless device. At 2120, the session management function may send a second message to a policy control function. The second message may comprise a request for at least one charging policy for the at least one PDU session. The second message may comprise the device type of the wireless device. At 2130, the session management function may receive a third message from the policy control function. The third message may comprise the at least one charging policy determined based on the device type for the wireless device. At 2140, the session management function may select a user plane function based on the device type for the wireless device. At 2150, the session management function may send a fourth message to the user plane function. The fourth message may comprise reporting rules based on the at least one charging policy.

According to an example embodiment, the fourth message may further comprise a request for session establishment for the at least one PDU session.

According to an example embodiment, the session management function may send a fifth message to an online charging system. The fifth message may request at least one credit. The fifth message may comprise the device type. According to an example embodiment, the online charging system may determine a charging credit based on the device type. According to an example embodiment, the session management function may receive a sixth message from the online charging system in response to the fifth message. The sixth message may comprise the charging credit applied to the device type.

According to an example embodiment, the at least one charging policy may comprise an information element indicating an online charging method. According to an example embodiment, the at least one charging policy may comprise an information element indicating an offline charging method. According to an example embodiment, the at least one charging policy may comprise an information element indicating a charging rate.

According to an example embodiment, the device type may comprise an internet of things (IoT) device. According to an example embodiment, the device type may comprise a vehicle device. According to an example embodiment, the device type may comprise a cell phone. a wearable device. According to an example embodiment, the device type may comprise a sensor for industry automation.

According to an example embodiment, the policy control function may determine the at least one charging policy based on the device type. According to an example embodiment, the policy control function may further determine an offline charging method based on the device type being a vehicle device type.

According to an example embodiment, the session management function may send a fifth message to the access and mobility management function. The fifth message may acknowledge establishment of the at least one PDU session.

According to an example embodiment, the first message may further comprise a service type. The service type may comprise a machine type communications (MTC). The service type may comprise an ultra-reliable low-latency communications (URLLC). The service type may comprise a vehicle-to-x communications (V2X). The service type may comprise an internet of things (IoT). The service type may comprise an application type for packed data service. According to an example embodiment, the policy control function may determine at least one charging policy for the at least one PDU session based on the service type.

According to an example embodiment, the second message may further comprises a service type. The service type may comprise a machine type communications (MTC). The service type may comprise an ultra-reliable low-latency communications (URLLC). The service type may comprise a vehicle-to-x communications (V2X). The service type may comprise an internet of things (IoT). The service type may comprise an application type for packed data service.

According to an example embodiment, the access and mobility management function may receive a fifth message from a wireless device. The fifth message may request establishment of the at least one PDU session. The fifth message may comprise the device type. The device type may comprise an internet of things device. The device type may comprise a vehicle device. The device type may comprise a cell phone. The device type may comprise a wearable device. The device type may comprise a sensor for industry automation.

According to an example embodiment, the session management function may receive a fifth message from the user plane function in response to the fourth message. The fifth message may acknowledge establishment of a user plane session.

According to an example embodiment, the session management function may send a fifth message to an online charging system. The fifth message may request credit for a service type. The fifth message may comprise the service type.

According to an example embodiment, the online charging system may determine a charging credit based on the service type. According to an example embodiment, the session management function may receive a seventh message from the online charging system, The seventh message may comprise a granted charging credit units. a seventh message the fifth message may further comprise at least one charging policy.

According to an example embodiment, the session management function may send a fifth message to an offline charging system. The fifth message may comprise a device type.

According to an example embodiment, the offline charging system may preform offline charging based on the device type. According to an example embodiment, the session management function may receive from the offline charging system, a response message confirming the offline charging.

According to an example embodiment, the session management function may send a fifth message a fifth message to an offline charging system. The fifth message may comprise a service type. According to an example embodiment, the offline charging system may perform offline charging based on the service type. According to an example embodiment, the session management function may receive a response message from the offline charging system. The response message may confirm the offline charging.

According to an example embodiment, the session management function may send a fifth message to the policy control function. The fifth message may report at least one traffic event associated with a device type. According to an example embodiment, the policy control function may determine at least one charging rule based on the at least one traffic event associated with a device type. According to an example embodiment, the session management function may receive a sixth message from the policy control function. The a sixth message may comprise the at least one charging rule.

According to an example embodiment, the session management function may send a seventh message to a charging system. The seventh message may comprise the at least one traffic event associated with a device type. According to an example embodiment, the charging system may perform charging based on the at least one traffic event associated with a device type. According to an example embodiment, the session management function may receive an eighth message from the charging system. The eighth message may acknowledge the charging.

According to an example embodiment, the charging system may comprise an online charging system. According to an example embodiment, the charging system may comprise an offline charging system.

Figure 22:
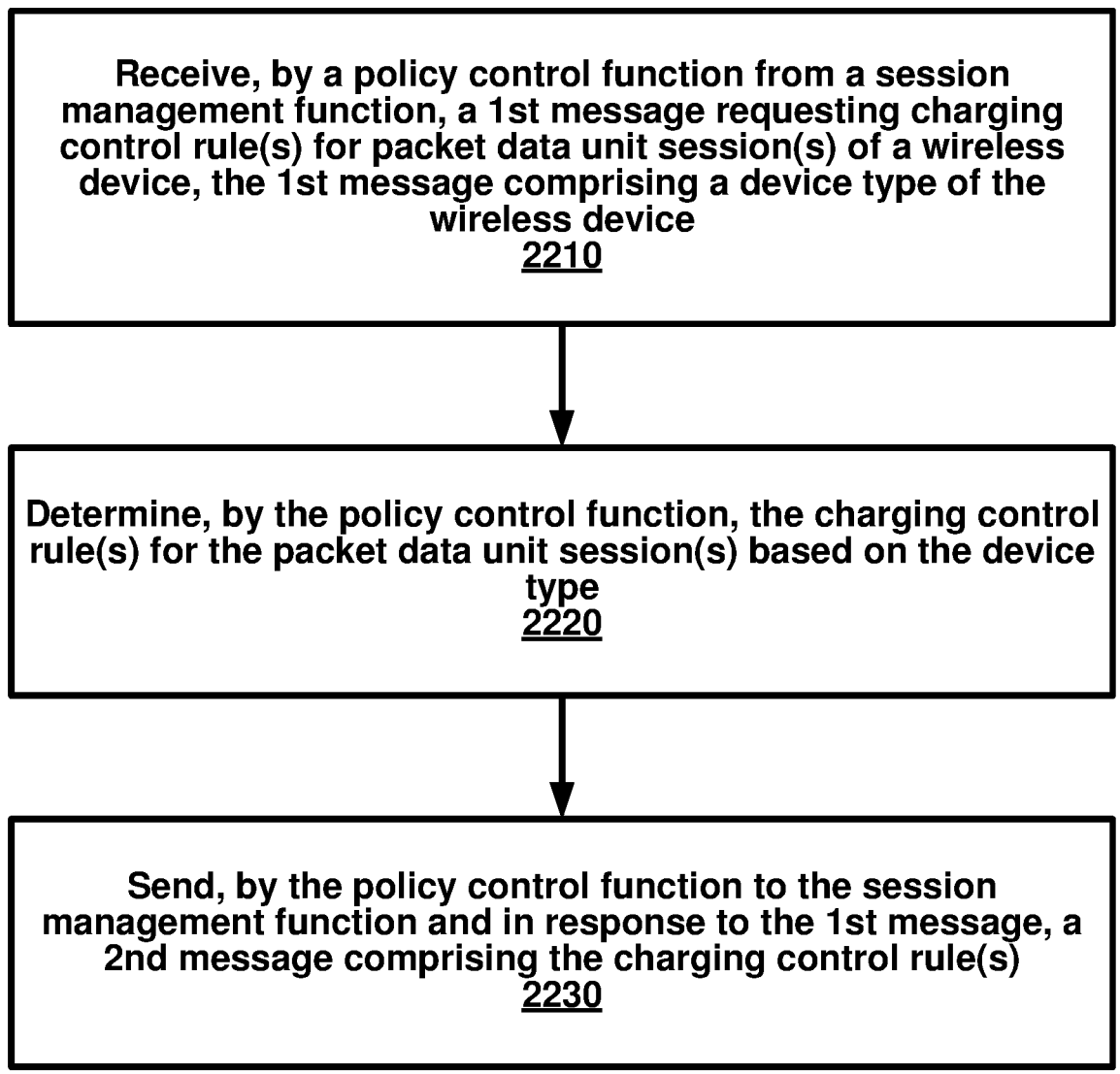
FIG. 22 is a flow diagram of an aspect of an embodiment of the present disclosure.

FIG. 22 is a flow diagram of an aspect of an embodiment of the present disclosure. At 2210, a policy control function may receive a first message from a session management function. The first message may request at least one charging control rule for at least one packet data unit session of a wireless device. The first message may comprise a device type of the wireless device. At 2220, the policy control function determine the at least one charging control rule for the at least one packet data unit session based on the device type. At 2230, the policy control function may send a second message to the session management function in response to the first message. The second message may comprise the at least one charging control rule.

FIG. 23 is a flow diagram of an aspect of an embodiment of the present disclosure. At 2310, a policy and charging control function may receive a first message from a packet data network (PDN) gateway. The first message may request at least one policy and charging control rule for at least one PDN session. The first message may comprise a device type. At 2320, the policy and charging control function may determine at least one charging rule for the at least one PDN session based on the device type. At 2330, the policy and charging control function may send a second message to the packet data network (PDN) gateway in response to the first message. The second message may comprise the at least one charging rule. The second message may comprise the device type.

Figure 24:
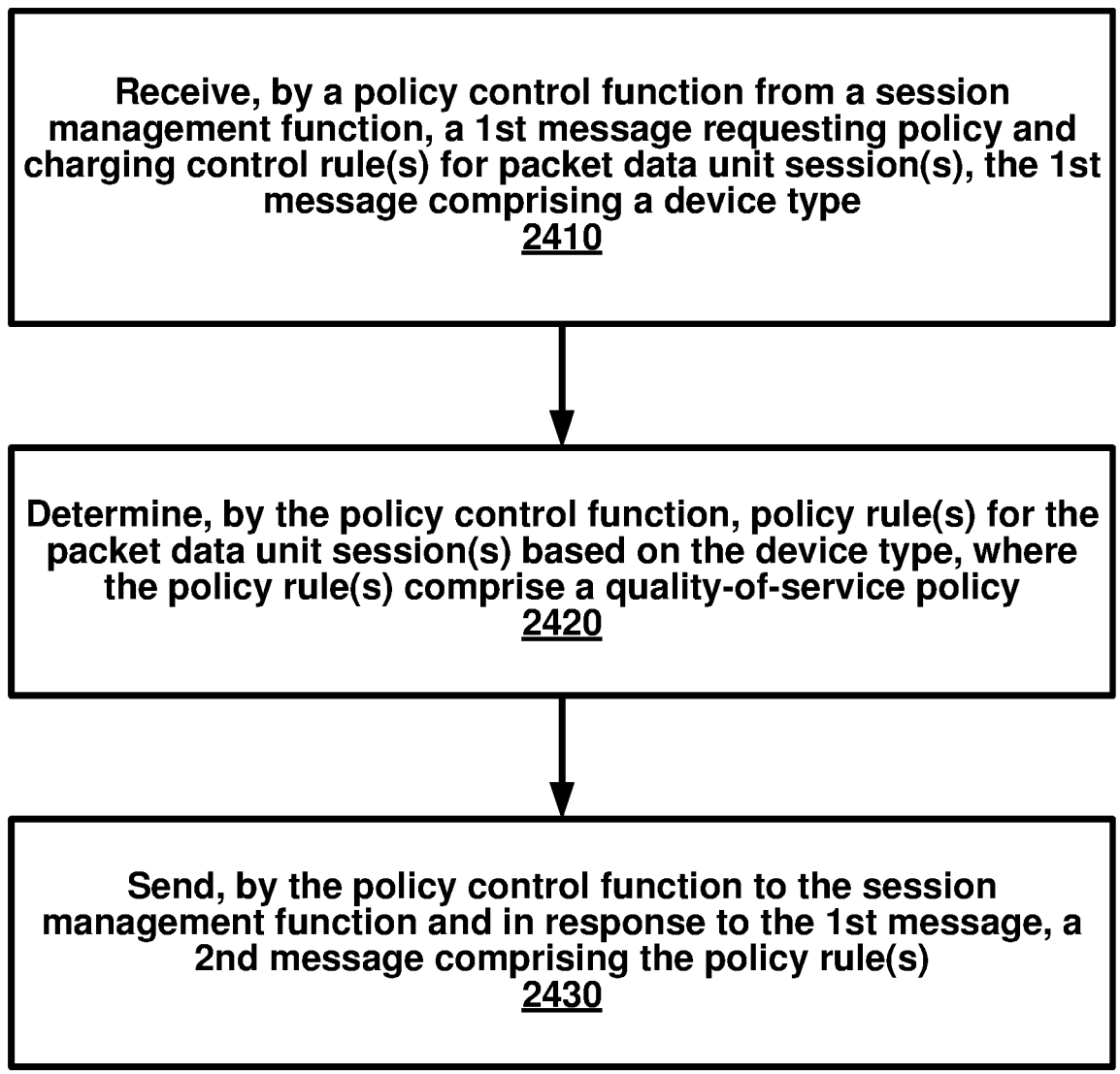
FIG. 24 is a flow diagram of an aspect of an embodiment of the present disclosure.

FIG. 24 is a flow diagram of an aspect of an embodiment of the present disclosure. At 2410, a policy control function may receive a first message from a session management function. The first message may request at least one policy and charging control rule for at least one packet data unit session. The first message may comprise a device type. At 2420, the policy control function may determine at least one policy rule for the at least one packet data unit session based on the device type. The at least one policy rule may comprise a quality-of-service policy. At 2430, the policy control function may send a second message to the session management function in response to the first message. The second message may comprise the at least one policy rule.

According to an example embodiment, the second message may comprise the device type. According to an example embodiment, the at least one policy rule may comprise a gating policy. According to an example embodiment, the at least one policy rule may comprise a traffic steering control policy.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A session management function (SMF), comprising:
one or more processors; and
memory storing instructions that, when executed by the one or more processors, cause the SMF to perform operations comprising:
selecting a user plane function (UPF) based on a device type of a wireless device, responsive to a session establishment request to establish a packet data unit (PDU) session for the wireless device, wherein the device type of the wireless device is indicated with the session establishment request; and
sending, to the UPF, reporting rules based on a charging policy received from a policy control function (PCF) responsive to a charging policy request sent to the PCF,
wherein the PCF performs determining the charging policy based on the device type of the wireless device, and
wherein the selecting the UPF and the determining the charging policy are both based on the device type indicated with the session establishment request.

2. The SMF of claim 1, the operations further comprising:
sending, to an online charging system, a credit request message requesting at least one credit, the credit request message indicating the device type; and
receiving, from the online charging system responsive to the credit request message, an indication of a charging credit applied to the device type.

3. The SMF of claim 1, wherein the reporting rules are sent in a request for session establishment for the PDU session.

4. The SMF of claim 1, wherein a further indication of a service type is provided with the session establishment request.

5. The SMF of claim 4, wherein:
the service type comprises at least one of:
a machine type communications (MTC);
an ultra-reliable low-latency communications (URLLC);
a vehicle-to-x communications (V2X);
an internet of things (IoT); or
an application type for packed data service; and
the device type comprises at least one of:
an internet of things (IoT) device;
a vehicle device;
a cell phone;
a wearable device; or
a sensor for industry automation.

6. The SMF of claim 1, the operations further comprising:
sending, to the PCF, the charging policy request comprising the device type of the wireless device indicated with the session establishment request;
sending, to the PCF, a report of a traffic event associated with the device type; and
receiving, from the PCF, at least one charging rule determined based on the traffic event associated with the device type.

7. The SMF of claim 1, the operations further comprising:
sending, to a charging system, a report of a traffic event associated with the device type; and
receiving, from the charging system, a charging based on the traffic event associated with the device type.

8. A policy control function (PCF), comprising:
one or more processors; and
memory storing instructions that, when executed by the one or more processors, cause the PCF to perform operations comprising:
receiving, from a session management function (SMF), a charging policy request comprising a request for a charging policy for a packet data unit (PDU) session associated with a wireless device, wherein the charging policy request further indicates a device type of the wireless device;
determining the charging policy based on the device type of the wireless device, wherein the determining the charging policy is based on a same device type used to select a user plane function (UPF) by the SMF; and
informing the SMF of the charging policy responsive to the charging policy request.

9. The PCF of claim 8, the operations further comprising:
determining an offline charging method based on the device type being a vehicle device type.

10. The PCF of claim 9, wherein the charging policy comprises an indication of the offline charging method.

11. The PCF of claim 8, wherein the charging policy request further comprises a service type, and wherein the service type comprises at least one of:
a machine type communications (MTC);
an ultra-reliable low-latency communications (URLLC);
a vehicle-to-x communications (V2X);
an internet of things (IoT); or
an application type for packed data service.

12. The PCF of claim 11, wherein the determining the charging policy for the PDU session is further based on the service type; and wherein the SMF sends, to the UPF, reporting rules based on the charging policy.

13. The PCF of claim 8, the operations further comprising:
receiving, from the session management function, a report of a traffic event associated with the device type;
determining, by the policy control function, a charging rule based on the traffic event associated with the device type; and
sending, to the session management function, the charging rule responsive to the report of the traffic event.

14. A non-transitory computer-readable medium storing instructions that, when executed by one or more processors, cause a session management function (SMF) to perform operations comprising:
selecting a user plane function (UPF) based on a device type of a wireless device, responsive to a session establishment request to establish a packet data unit (PDU) session for the wireless device, wherein the device type of the wireless device is indicated with the session establishment request; and
sending, to the UPF, reporting rules based on a charging policy received from a policy control function (PCF) responsive to a charging policy request sent to the PCF,
wherein the PCF performs determining the charging policy based on the device type of the wireless device, and
wherein the selecting the UPF and the determining the charging policy are both based on the device type indicated with the session establishment request.

15. The non-transitory computer-readable medium of claim 14, the operations further comprising:
sending, to an online charging system, a credit request message requesting at least one credit, the credit request message indicating the device type; and receiving, from the online charging system responsive to the credit request message, an indication of a charging credit applied to the device type.

16. The non-transitory computer-readable medium of claim 14, wherein the reporting rules are sent in a request for session establishment for the PDU session.

17. The non-transitory computer-readable medium of claim 14, wherein a further indication of a service type is provided with the session establishment request.

18. The non-transitory computer-readable medium of claim 17, wherein:
the service type comprises at least one of:
a machine type communications (MTC);
an ultra-reliable low-latency communications (URLLC);
a vehicle-to-x communications (V2X);
an internet of things (IoT); or
an application type for packed data service; and
the device type comprises at least one of:
an internet of things (IoT) device;
a vehicle device;
a cell phone;
a wearable device; or
a sensor for industry automation.

19. The non-transitory computer-readable medium of claim 14, the operations further comprising:
sending, to the PCF, the charging policy request comprising the device type of the wireless device indicated with the session establishment request;
sending, to the PCF, a report of a traffic event associated with the device type; and
receiving, from the PCF, at least one charging rule determined based on the traffic event associated with the device type.

20. The non-transitory computer-readable medium of claim 14, the operations further comprising:
sending, to a charging system, a report of a traffic event associated with the device type; and
receiving, from the charging system, a charging based on the traffic event associated with the device type.

* * * * *